United States Patent
Sun et al.

(10) Patent No.: US 10,869,229 B2
(45) Date of Patent: Dec. 15, 2020

(54) DATA TRANSMISSION METHOD AND RELATED DEVICE

(71) Applicant: HUAWEI TECHNOLOGIES CO., LTD., Guangdong (CN)

(72) Inventors: Yanliang Sun, Beijing (CN); Da Wang, Beijing (CN); Jian Wang, Beijing (CN); Bin Liu, San Diego, CA (US)

(73) Assignee: Huawei Technologies Co., Ltd., Guangdong (CN)

( * ) Notice: Subject to any disclaimer, the term of this patent is extended or adjusted under 35 U.S.C. 154(b) by 281 days.

(21) Appl. No.: 15/758,465

(22) PCT Filed: Sep. 9, 2015

(86) PCT No.: PCT/CN2015/089215
§ 371 (c)(1),
(2) Date: Mar. 8, 2018

(87) PCT Pub. No.: WO2017/041240
PCT Pub. Date: Mar. 16, 2017

(65) Prior Publication Data
US 2018/0249379 A1 Aug. 30, 2018

(51) Int. Cl.
*H04W 88/04* (2009.01)
*H04W 28/22* (2009.01)
(Continued)

(52) U.S. Cl.
CPC ........... *H04W 28/22* (2013.01); *H04L 5/0048* (2013.01); *H04L 25/0202* (2013.01);
(Continued)

(58) Field of Classification Search
CPC .................................................... H04W 72/04
See application file for complete search history.

(56) References Cited

U.S. PATENT DOCUMENTS

2007/0264932 A1  11/2007  Suh et al.
2008/0056334 A1   3/2008  Suh et al.
(Continued)

FOREIGN PATENT DOCUMENTS

CN   101789815 A   7/2010
CN   102792745 A   11/2012
(Continued)

OTHER PUBLICATIONS

Extended European Search Report issued in European Application No. 15903347.1 dated Jul. 11, 2018, 7 pages.
(Continued)

*Primary Examiner* — Ayanah S George
(74) *Attorney, Agent, or Firm* — Fish & Richardson P.C.

(57) ABSTRACT

According to example data transmission methods and related devices provided in the present disclosure, a base station receives first channel state information (CSI) and an indication message that are sent by a first terminal, and may determine a size of a downlink transmission data block from the base station to the first terminal according to the first CSI and the indication message. In doing so, a downlink transmission rate from the base station to the first terminal matches a downlink transmission rate from the first terminal to a second terminal.

20 Claims, 14 Drawing Sheets

(51) Int. Cl.
*H04W 16/02* (2009.01)
*H04L 5/00* (2006.01)
*H04L 25/02* (2006.01)
*H04W 28/24* (2009.01)
*H04W 72/04* (2009.01)
*H04W 72/08* (2009.01)
*H04B 7/06* (2006.01)

(52) U.S. Cl.
CPC ........... *H04W 16/02* (2013.01); *H04W 28/24* (2013.01); *H04W 72/0406* (2013.01); *H04B 7/0626* (2013.01); *H04W 72/085* (2013.01); *H04W 88/04* (2013.01)

(56) References Cited

U.S. PATENT DOCUMENTS

| | | | | |
|---|---|---|---|---|
| 2008/0285500 | A1* | 11/2008 | Zhang | H04B 7/15507 370/315 |
| 2010/0054170 | A1* | 3/2010 | Zhu | H04W 72/04 370/315 |
| 2012/0243431 | A1 | 9/2012 | Chen et al. | |
| 2013/0083722 | A1 | 4/2013 | Bhargava et al. | |
| 2014/0315541 | A1* | 10/2014 | Lu | H04W 24/10 455/426.1 |

FOREIGN PATENT DOCUMENTS

| | | |
|---|---|---|
| CN | 103067132 A | 4/2013 |
| CN | 103929276 A | 7/2014 |
| CN | 103929755 A | 7/2014 |
| WO | 2014176782 A1 | 11/2014 |

OTHER PUBLICATIONS

International Search Report issued in International Application No. PCT/CN2015/089215 dated May 27, 2016, 12 pages.

Office Action issued in Chinese Application No. 201580082875.3 dated Aug. 7, 2019, 10 pages.

* cited by examiner

DATA TRANSMISSION METHOD AND RELATED DEVICE

CROSS-REFERENCE TO RELATED APPLICATIONS

This application is a national stage of International Application No. PCT/CN2015/089215, filed on Sep. 9, 2015, which is hereby incorporated by reference in its entirety.

TECHNICAL FIELD

The present invention relates to the field of communications technologies, and in particular, to a data transmission method and a related device.

BACKGROUND

Currently, if a wearable device has a large data downloading requirement, the wearable device may connect to a terminal by using a local area network connection technology such as Wireless Fidelity (WIreless-Fidelity, WiFi) or Bluetooth, and perform downloading by means of a data network connection shared by the high-performance terminal.

The prior art has the following disadvantages: 1. Downlink data needs to be cached in a terminal that functions as a relay node, and therefore real-time quality of data is affected, and a delay is increased. 2. In the prior art, an existing local area network connection technology (such as WiFi) is used. Because a carrier sense-avoidance solution is used in the existing local area network connection technology for spectrum resource management, in the future, as a large quantity of wearable devices are used, spectrum resources may be insufficient, and overall network transmission performance may significantly decrease. 3. In the prior art, the wearable device is invisible to a core network, and therefore related quality of service QoS cannot be monitored in the core network in a centralized manner.

In conclusion, in the prior art, two links of a relay use different standards and specifications, and therefore an overall rate of the two links can hardly match actual link quality.

SUMMARY

The present invention provides a data transmission method and a related device to reduce a relay cache and improve data transmission performance.

A first aspect of embodiments of the present invention provides a data transmission method, including:

receiving, by a base station, first channel state information CSI sent by a first terminal, where the first CSI is CSI between the base station and the first terminal;

receiving, by the base station, an indication message sent by the first terminal; and determining, by the base station, a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

With reference to the first aspect of the embodiments of the present invention, in a first implementation of the first aspect of the embodiments of the present invention, the indication message is second CSI, the second CSI is CSI between the first terminal and the second terminal, and the determining, by the base station, a size of a downlink transmission data block from the base station to the first terminal according to the first CSI and the indication message includes:

estimating, by the base station, a size of a second target data block according to the second CSI, where the second target data block is a downlink transmission data block transmitted on a resource allocated by the first terminal to the second terminal in a second subframe; and determining, by the base station, a size of a first target data block according to the first CSI and the size of the second target data block, where the first target data block is a downlink transmission data block transmitted on a resource allocated by the base station to the first terminal in a first subframe, a quantity of bits transmitted on the first target data block is less than or equal to a quantity of bits transmitted on the second target data block, and the second subframe is a subframe subsequent to the first subframe; and after the determining, by the base station, a size of a downlink transmission data block from the base station to the first terminal according to the first CSI and the indication message, the method further includes:

sending, by the base station, the first target data block to the first terminal in the first subframe.

With reference to the first implementation of the first aspect of the embodiments of the present invention, in a second implementation of the first aspect of the embodiments of the present invention, after the sending, by the base station, the first target data block to the first terminal in the first subframe, the method further includes:

receiving, by the base station, a receive failure message sent by the first terminal, where the receive failure message is used to instruct the base station not to perform scheduling in a period of a third subframe, and the third subframe is a subframe subsequent to the second subframe; and determining, by the base station according to the receive failure message, not to perform resource scheduling in the period of the third subframe.

With reference to the second implementation of the first aspect of the embodiments of the present invention, in a third implementation of the first aspect of the embodiments of the present invention, the receive failure message is used to indicate that the second terminal fails to receive the second target data block in the second subframe.

With reference to the first aspect of the embodiments of the present invention, in a fourth implementation of the first aspect of the embodiments of the present invention, the indication message is a rate change identifier, the rate change identifier is used to indicate a rate change requirement on the downlink transmission rate from the base station to the first terminal, and the determining, by the base station, a size of a downlink transmission data block from the base station to the first terminal according to the first CSI and the indication message includes:

determining, by the base station, the size of the downlink transmission data block from the base station to the first terminal according to the first CSI and the rate change identifier, where a change of the downlink transmission rate from the base station to the first terminal meets the rate change requirement indicated by the rate change identifier, so that a value of the downlink transmission rate from the base station to the first terminal is less than or equal to a value of the downlink transmission rate from the first terminal to the second terminal.

With reference to the first aspect of the embodiments of the present invention, in a fifth implementation of the first aspect of the embodiments of the present invention, the indication message is a second average rate, the second average rate is an average rate at which the first terminal sends the downlink data to the second terminal, and the determining, by the base station, a size of a downlink transmission data block from the base station to the first terminal according to the first CSI and the indication message includes:

determining, by the base station, a first average rate according to the first CSI and the second average rate, where the first average rate is an average rate at which the base station sends the downlink data to the first terminal, and the first average rate is less than or equal to the second average rate; and determining, by the base station, the size of the downlink transmission data block from the base station to the first terminal according to the first average rate, where the average rate at which the base station sends the downlink data to the first terminal is the first average rate.

A second aspect of embodiments of the present invention provides a data transmission method, including:

sending, by a first terminal, first channel state information CSI and an indication message to a base station, where the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

With reference to the second aspect of the embodiments of the present invention, in a first implementation of the second aspect of the embodiments of the present invention, the indication message is second CSI, and the second CSI is CSI between the first terminal and the second terminal; and the method further includes:

determining, by the first terminal, a size of a second target data block according to the second CSI, where the second target data block is a downlink transmission data block transmitted on a resource allocated by the first terminal to the second terminal in a second subframe;

receiving, by the first terminal in a first subframe, a first target data block sent by the base station, where the first target data block is a downlink transmission data block transmitted on a resource allocated by the base station to the first terminal in the first subframe, a quantity of bits transmitted on the first target data block is less than or equal to a quantity of bits transmitted on the second target data block, and the second subframe is a subframe subsequent to the first subframe; and sending, by the first terminal, the second target data block to the second terminal in the second subframe.

With reference to the first implementation of the second aspect of the embodiments of the present invention, in a second implementation of the second aspect of the embodiments of the present invention, before the sending, by a first terminal, first channel state information CSI and an indication message to a base station, the method further includes:

sending, by the first terminal to the second terminal, a pilot signal that is used for channel estimation; and receiving, by the first terminal, the second CSI generated by the second terminal according to the pilot signal; or receiving, by the first terminal, a pilot signal that is used for channel estimation and sent by the second terminal; and performing, by the first terminal, channel estimation and generating the second CSI according to the pilot signal.

With reference to the first implementation of the second aspect of the embodiments of the present invention or the second implementation of the second aspect of the embodiments of the present invention, in a third implementation of the second aspect of the embodiments of the present invention, if the quantity of bits transmitted on the first target data block is less than the quantity of bits transmitted on the second target data block, before the sending, by the first terminal, the second target data block to the second terminal in the second subframe, the method further includes:

performing, by the first terminal, null filling on the first target data block, to form the second target data block.

With reference to any one of the first implementation of the second aspect of the embodiments of the present invention to the third implementation of the second aspect of the embodiments of the present invention, in a fourth implementation of the second aspect of the embodiments of the present invention, after the sending, by the first terminal, the second target data block to the second terminal in the second subframe, the method further includes:

receiving, by the first terminal, a receive failure message sent by the second terminal;

forwarding, by the first terminal, the receive failure message to the base station, where the receive failure message is used to instruct the base station not to perform scheduling in a period of a third subframe, and the third subframe is a subframe subsequent to the second subframe; and resending, by the first terminal, the second target data block to the second terminal in the third subframe.

With reference to the fourth implementation of the second aspect of the embodiments of the present invention, in a fifth implementation of the second aspect of the embodiments of the present invention, the receive failure message is used to indicate that the second terminal fails to receive the second target data block in the second subframe.

With reference to the second aspect of the embodiments of the present invention, in a sixth implementation of the second aspect of the embodiments of the present invention, the indication message is a rate change identifier, the rate change identifier is used to indicate a rate change requirement on the downlink transmission rate from the base station to the first terminal, and the rate change identifier is used to trigger the base station to determine the size of the downlink transmission data block from the base station to the first terminal according to the first CSI and the rate change identifier, so that a change of the downlink transmission rate from the base station to the first terminal meets the rate change requirement indicated by the rate change identifier, and a value of the downlink transmission rate from the base station to the first terminal is less than or equal to a value of the downlink transmission rate from the first terminal to the second terminal.

With reference to the sixth implementation of the second aspect of the embodiments of the present invention, in a seventh implementation of the second aspect of the embodiments of the present invention, before the sending, by a first terminal, first channel state information CSI and an indication message to a base station, the method further includes:

determining, by the first terminal, the rate change identifier according to a length of transmitted data cached in the first terminal.

With reference to the second aspect of the embodiments of the present invention, in an eighth implementation of the second aspect of the embodiments of the present invention, the indication message is a second average rate, the second average rate is an average rate at which the first terminal sends the downlink data to the second terminal, and the second average rate is used to trigger the base station to determine a first average rate according to the first CSI and the second average rate, where the first average rate is an average rate at which the base station sends the downlink data to the first terminal, the first average rate is less than or equal to the second average rate, and the first average rate is used to trigger the base station to determine the size of the downlink transmission data block from the base station to the first terminal according to the first average rate.

A third aspect of embodiments of the present invention provides a base station, including:

a transmitter, a receiver, a processor, and a memory, where the processor is separately connected to the transmitter, the receiver, and the memory;

the receiver is configured to receive first channel state information CSI sent by a first terminal, where the first CSI is CSI between the base station and the first terminal;

the receiver is further configured to receive an indication message sent by the first terminal; and the processor is configured to determine a size of a downlink transmission data block from the base station to the first terminal according to the first CSI and the indication message that are received by the receiver;

the processor is further configured to notify the transmitter of the determined size of the downlink transmission data block from the base station to the first terminal; and the transmitter is configured to send, according to the size that is of the downlink transmission data block from the base station to the first terminal and that is determined by the processor, downlink data stored in the memory to the first terminal, where a downlink transmission rate from the base station to the first terminal matches a downlink transmission rate from the first terminal to a second terminal, and the first terminal is configured to forward, to the second terminal, the downlink data sent by the base station.

With reference to the third aspect of the embodiments of the present invention, in a first implementation of the third aspect of the embodiments of the present invention, the indication message received by the receiver is second CSI, the second CSI is CSI between the first terminal and the second terminal, and the processor is further configured to estimate a size of a second target data block according to the second CSI, where the second target data block is a downlink transmission data block transmitted on a resource allocated by the first terminal to the second terminal in a second subframe;

the processor is further configured to determine a size of a first target data block according to the first CSI and the size of the second target data block, where the first target data block is a downlink transmission data block transmitted on a resource allocated by the base station to the first terminal in a first subframe, a quantity of bits transmitted on the first target data block is less than or equal to a quantity of bits transmitted on the second target data block, and the second subframe is a subframe subsequent to the first subframe; and the transmitter is configured to send the first target data block to the first terminal in the first subframe.

With reference to the first implementation of the third aspect of the embodiments of the present invention, in a second implementation of the third aspect of the embodiments of the present invention, the receiver is further configured to receive a receive failure message sent by the first terminal, where the receive failure message is used to instruct the base station not to perform scheduling in a period of a third subframe, and the third subframe is a subframe subsequent to the second subframe; and the processor is further configured to determine, according to the receive failure message received by the receiver, not to perform resource scheduling in the period of the third subframe.

With reference to the second implementation of the third aspect of the embodiments of the present invention, in a third implementation of the third aspect of the embodiments of the present invention, the receive failure message received by the receiver is used to indicate that the second terminal fails to receive the second target data block in the second subframe.

With reference to the third aspect of the embodiments of the present invention, in a fourth implementation of the third aspect of the embodiments of the present invention, the indication message received by the receiver is a rate change identifier, and the rate change identifier is used to indicate a rate change requirement on the downlink transmission rate from the base station to the first terminal; and the processor is further configured to determine the size of the downlink transmission data block from the base station to the first terminal according to the first CSI and the rate change identifier, where a change of the downlink transmission rate from the base station to the first terminal meets the rate change requirement indicated by the rate change identifier, so that a value of the downlink transmission rate from the base station to the first terminal is less than or equal to a value of the downlink transmission rate from the first terminal to the second terminal.

With reference to the third aspect of the embodiments of the present invention, in a fifth implementation of the third aspect of the embodiments of the present invention, the indication message received by the receiver is a second average rate, the second average rate is an average rate at which the first terminal sends the downlink data to the second terminal, and the processor is further configured to determine a first average rate according to the first CSI and the second average rate, where the first average rate is an average rate at which the base station sends the downlink data to the first terminal, and the first average rate is less than or equal to the second average rate; and the processor is further configured to determine the size of the downlink transmission data block from the base station to the first terminal according to the first average rate, where the average rate at which the base station sends the downlink data to the first terminal is the first average rate.

A fourth aspect of embodiments of the present invention provides a first terminal, including a transmitter, where the transmitter is configured to send first channel state information CSI and an indication message to a base station, the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

With reference to the fourth aspect of the embodiments of the present invention, in a first implementation of the fourth aspect of the embodiments of the present invention, the indication message sent by the transmitter is second CSI, the second CSI is CSI between the first terminal and the second terminal, and the first terminal further includes a processor and a receiver, where the transmitter and the receiver are connected to the processor;

the processor is configured to determine a size of a second target data block according to the second CSI, where the second target data block is a downlink transmission data block transmitted on a resource allocated by the first terminal to the second terminal in a second subframe;

the receiver is configured to receive, in a first subframe, a first target data block sent by the base station, where the first target data block is a downlink transmission data block transmitted on a resource allocated by the base station to the first terminal in the first subframe, a quantity of bits transmitted on the first target data block is less than or equal to a quantity of bits transmitted on the second target data block, and the second subframe is a subframe subsequent to the first subframe; and the transmitter is further configured to send the second target data block to the second terminal in the second subframe.

With reference to the first implementation of the fourth aspect of the embodiments of the present invention, in a second implementation of the fourth aspect of the embodiments of the present invention, the transmitter is further configured to send, to the second terminal, a pilot signal that is used for channel estimation; and the receiver is further configured to receive the second CSI generated by the second terminal according to the pilot signal; or the receiver is further configured to receive a pilot signal that is used for channel estimation and sent by the second terminal; and the processor is further configured to perform channel estimation and generate the second CSI according to the pilot signal received by the receiver.

With reference to the first implementation of the fourth aspect of the embodiments of the present invention or the second implementation of the fourth aspect of the embodiments of the present invention, in a third implementation of the fourth aspect of the embodiments of the present invention, if the quantity of bits transmitted on the first target data block is less than the quantity of bits transmitted on the second target data block, the processor is further configured to perform null filling on the first target data block, to form the second target data block.

With reference to any one of the first implementation of the fourth aspect of the embodiments of the present invention to the third implementation of the fourth aspect of the embodiments of the present invention, in a fourth implementation of the fourth aspect of the embodiments of the present invention, the receiver is further configured to receive a receive failure message sent by the second terminal;

the transmitter is further configured to forward the receive failure message to the base station, where the receive failure message is used to instruct the base station not to perform scheduling in a period of a third subframe, and the third subframe is a subframe subsequent to the second subframe; and the transmitter is further configured to resend the second target data block to the second terminal in the third subframe.

With reference to the fourth implementation of the fourth aspect of the embodiments of the present invention, in a fifth implementation of the fourth aspect of the embodiments of the present invention, the receive failure message received by the receiver is used to indicate that the second terminal fails to receive the second target data block in the second subframe.

With reference to the fourth aspect of the embodiments of the present invention, in a sixth implementation of the fourth aspect of the embodiments of the present invention, the indication message sent by the transmitter is a rate change identifier, the rate change identifier is used to indicate a rate change requirement on the downlink transmission rate from the base station to the first terminal, and the rate change identifier is used to trigger the base station to determine the size of the downlink transmission data block from the base station to the first terminal according to the first CSI and the rate change identifier, so that a change of the downlink transmission rate from the base station to the first terminal meets the rate change requirement indicated by the rate change identifier, and a value of the downlink transmission rate from the base station to the first terminal is less than or equal to a value of the downlink transmission rate from the first terminal to the second terminal.

With reference to the sixth implementation of the fourth aspect of the embodiments of the present invention, in a seventh implementation of the fourth aspect of the embodiments of the present invention, the first terminal further includes a processor and a memory, where the processor is separately connected to the transmitter and the memory;

the memory is configured to cache transmitted data; and the processor is configured to determine the rate change identifier according to a length of the transmitted data cached in the memory.

With reference to the fourth aspect of the embodiments of the present invention, in an eighth implementation of the fourth aspect of the embodiments of the present invention, the indication message sent by the transmitter is a second average rate, the second average rate is an average rate at which the first terminal sends the downlink data to the second terminal, and the second average rate is used to trigger the base station to determine a first average rate according to the first CSI and the second average rate, where the first average rate is an average rate at which the base station sends the downlink data to the first terminal, the first average rate is less than or equal to the second average rate, and the first average rate is used to trigger the base station to determine the size of the downlink transmission data block from the base station to the first terminal according to the first average rate.

According to the data transmission method and the related device provided in the present invention, the base station receives the first CSI and the indication message that are sent by the first terminal, and the base station may determine the size of the downlink transmission data block from the base station to the first terminal according to the first CSI and the indication message, so that the downlink transmission rate from the base station to the first terminal matches the downlink transmission rate from the first terminal to the second terminal. Therefore, a cache in the first terminal is reduced, and a delay in sending the downlink data to the second terminal by the base station can be effectively reduced. In addition, the second terminal is visible to a core network, so that the core network can monitor quality of service QoS in a centralized manner.

DESCRIPTION OF EMBODIMENTS

Figure 1:
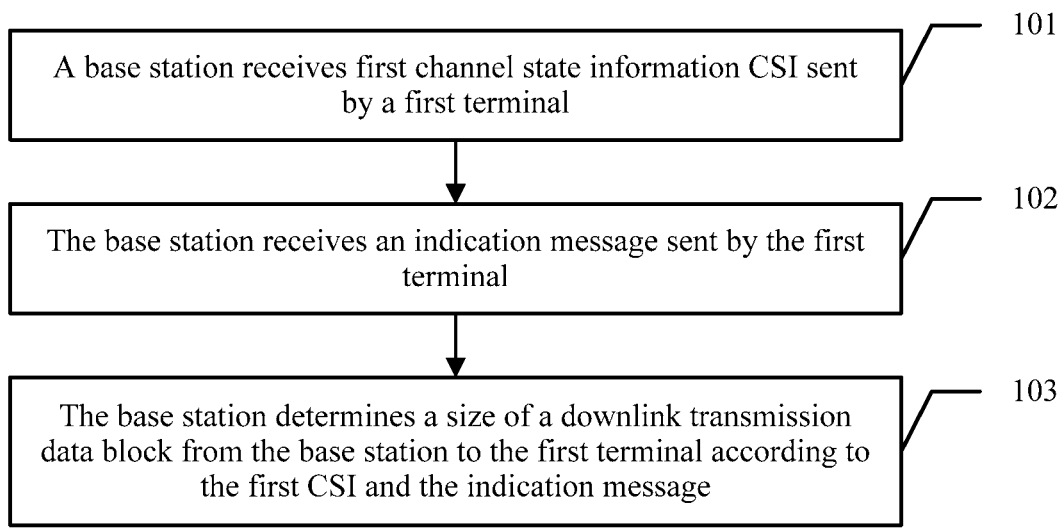
FIG. 1 is a step flowchart of a data transmission method according to an embodiment of the present invention.

With reference to FIG. 1, the following describes a data transmission method provided in an embodiment of the present invention.

First, a second terminal shown in this embodiment is described by using a terminal that has a relatively short standby time, a relatively low processing capability, and relatively few antennas as an example.

For example, the second terminal may be a wearable device, such as a wearable electronic watch.

In a process in which the second terminal performs data communication with a base station, a first terminal that has a higher processing capability may be used for relaying, to reduce energy consumption of the second terminal and improve efficiency of data transmission.

The first terminal is not limited in this embodiment. For example, the first terminal may be a smartphone, a tablet computer, or the like.

The first terminal has a longer battery life than the second terminal, and the first terminal has more antennas than the second terminal.

It can be learned that the second terminal can perform data communication with the base station by using the first terminal near the second terminal, and in a data communication process, not only a relatively high data transmission rate and relatively little interference power can be ensured, but also relatively low power consumption of the second terminal can be maintained, thereby prolonging the standby time of the second terminal.

Specifically, the base station sends, to the first terminal, downlink data that needs to be sent to the second terminal, and the first terminal performs forwarding. That is, the first terminal forwards, to the second terminal, the downlink data sent by the base station.

The data transmission method provided in this embodiment includes the following steps.

101. The base station receives first channel state information CSI sent by the first terminal.

The first CSI is CSI between the base station and the first terminal.

Specifically, a manner of obtaining the first CSI may be:

sending, by the base station, a pilot signal to the first terminal; and performing, by the first terminal, channel estimation according to the pilot signal to obtain the first CSI, and sending the obtained first CSI to the base station.

It should be understood that the foregoing manner in which the base station obtains the first CSI is described as an example, and is not limited.

102. The base station receives an indication message sent by the first terminal.

103. The base station determines a size of a downlink transmission data block from the base station to the first terminal according to the first CSI and the indication message.

In this embodiment, specific content of the indication message sent by the first terminal is not limited, provided that the base station can determine the size of the downlink transmission data block from the base station to the first terminal according to the first CSI and the indication message, and further the base station can adjust the size of the downlink transmission data block from the base station to the first terminal, to adjust a downlink transmission rate from the base station to the first terminal, so that the downlink transmission rate from the base station to the first terminal matches a downlink transmission rate from the first terminal to the second terminal.

In this embodiment, the base station determines the size of the downlink transmission data block from the base station to the first terminal, so that the downlink transmission rate from the base station to the first terminal matches the downlink transmission rate from the first terminal to the second terminal. Therefore, a cache in the first terminal is reduced, and a delay in sending the downlink data to the second terminal by the base station can be effectively reduced. In addition, the second terminal is visible to a core network, so that the core network can monitor quality of service QoS in a centralized manner.

In the embodiment shown in FIG. 1, the data transmission method is described from a perspective of the base station.

Figure 2:
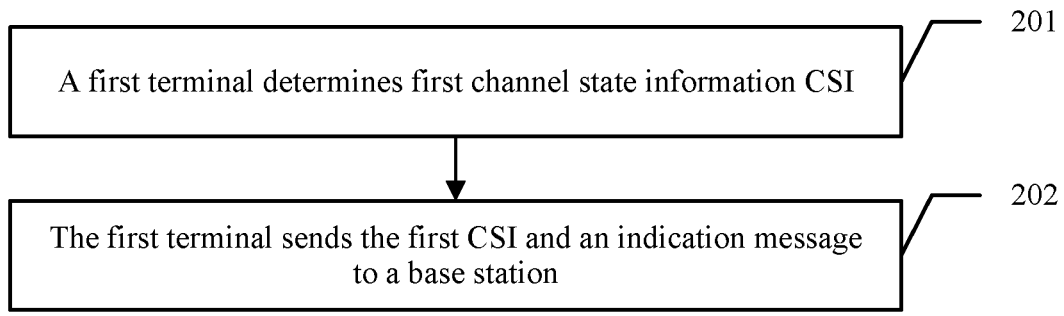
FIG. 2 is another step flowchart of a data transmission method according to an embodiment of the present invention.

The following describes the data transmission method from a perspective of the first terminal with reference to FIG. 2.

The first terminal shown in this embodiment is configured to receive the downlink data that is sent by the base station and that needs to be sent to the second terminal, and the first terminal is configured to forward the downlink data to the second terminal.

The data transmission method includes the following steps.

201. The first terminal determines first channel state information CSI.

The first CSI is CSI between the base station and the first terminal.

In this embodiment, the first terminal may receive a pilot signal sent by the base station.

The first terminal performs channel estimation according to the pilot signal, to obtain the first CSI.

202. The first terminal sends the first CSI and an indication message to the base station.

The base station determines a size of a downlink transmission data block from the base station to the first terminal according to the first CSI and the indication message, so that a downlink transmission rate from the base station to the first terminal matches a downlink transmission rate from the first terminal to the second terminal.

In this embodiment, the first terminal sends the first CSI and the indication message to the base station, and the base station determines the size of the downlink transmission data block from the base station to the first terminal, so that the downlink transmission rate from the base station to the first terminal matches the downlink transmission rate from the first terminal to the second terminal. Therefore, a cache in the first terminal is reduced, and efficiency of forwarding, by the first terminal to the second terminal, the downlink data sent by the base station is effectively improved. In addition, the second terminal is visible to a core network, so that the core network can monitor quality of service QoS in a centralized manner.

Figure 3A:
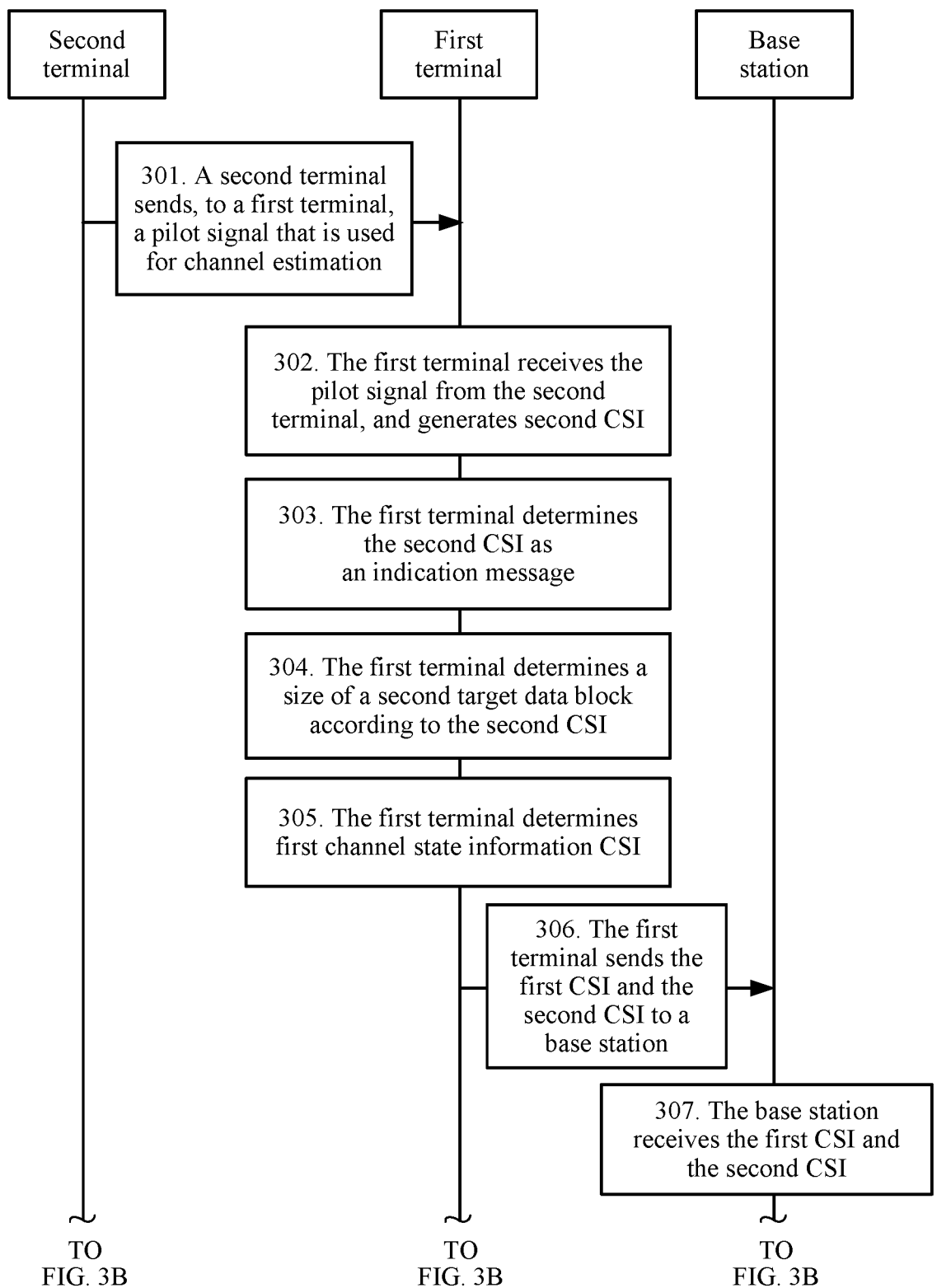
FIG. 3A and FIG. 3B are still another step flowchart of a data transmission method according to an embodiment of the present invention.
Figure 3B:
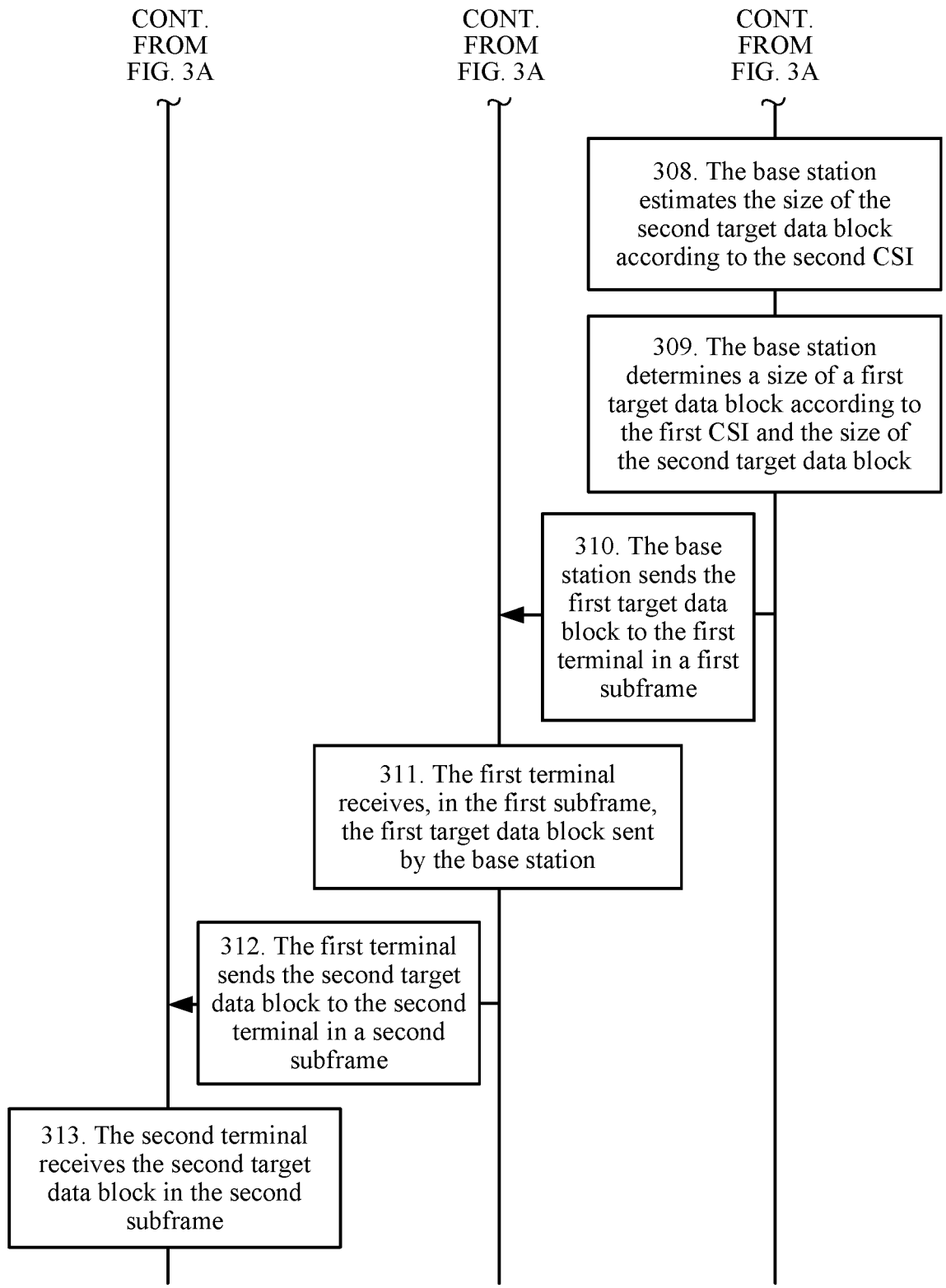

With reference to FIG. 3A and FIG. 3B, the following describes how the downlink transmission rate from the base station to the first terminal specifically matches the downlink transmission rate from the first terminal to the second terminal when the indication message is CSI between the first terminal and the second terminal.

First, refer to FIG. 3A and FIG. 3B.

301. The second terminal sends, to the first terminal, a pilot signal that is used for channel estimation.

302. The first terminal receives the pilot signal from the second terminal, and generates the second CSI.

The second CSI is the CSI between the first terminal and the second terminal.

Specifically, for obtaining of the second CSI of a link from the second terminal to the first terminal, because links between the first terminal and the second terminal usually occupy a same spectrum resource in different timeslots, by virtue of channel reciprocity, the second terminal sends a channel estimation dedicated sequence, and the first terminal directly performs channel estimation to obtain the corresponding second CSI.

In this embodiment, how the first terminal obtains the second CSI is described in step 301 and step 302. It should be understood that step 301 and step 302 are merely an example for description, and impose no limitation.

For example, a manner in which the first terminal determines the second CSI may alternatively be:

receiving, by the second terminal, a pilot signal that is used for channel estimation and sent by the first terminal;

performing, by the second terminal, channel estimation and generating the second CSI according to the pilot signal; and feeding back, by the second terminal, the second CSI to the first terminal.

303. The first terminal determines the second CSI as the indication message.

304. The first terminal determines a size of a second target data block according to the second CSI.

Specifically, the second target data block is a downlink transmission data block transmitted on a resource allocated by the first terminal to the second terminal in a second subframe.

More specifically, the first terminal schedules a link resource between the first terminal and the second terminal according to the second CSI.

More specifically, the link resource between the first terminal and the second terminal includes: a transport layer quantity, a time-frequency resource block, and a modulation coding rate. A quantity of bits that can be sent in the second subframe depends on the transport layer quantity, the time-frequency resource block, and the modulation coding rate.

Optionally, that the first terminal schedules the link resource between the first terminal and the second terminal specifically includes: scheduling, by the first terminal, a modulation coding rate of a link between the first terminal and the second terminal. A scheduling basis of the first terminal is the second CSI that is between the first terminal and the second terminal and that is obtained by the first terminal by means of channel estimation.

Optionally, a time-frequency resource block of a link between the first terminal and the second terminal depends on a quasi-static resource pool preconfigured by the base station, but the first terminal may report a resource pool increase/reduction request to the base station according to a service requirement change, and then the base station performs reconfiguration by using control signaling.

In this solution, the transport layer quantity is 1.

305. The first terminal determines first channel state information CSI.

For a specific implementation process of step 305 in this embodiment, refer to step 201 shown in FIG. 2, and details are not described in this embodiment again.

There is no time sequence in performing the foregoing steps in this embodiment. This embodiment is merely an example for description, and imposes no limitation on a time sequence of the steps.

306. The first terminal sends the first CSI and the second CSI to the base station.

307. The base station receives the first CSI and the second CSI.

It can be learned that the first terminal reports the two pieces of CSI to the base station. One is the first CSI between the base station and the first terminal, and the other is the second CSI between the first terminal and the second terminal.

308. The base station estimates the size of the second target data block according to the second CSI.

Specifically, the second target data block is the downlink transmission data block transmitted on the resource allocated by the first terminal to the second terminal in the second subframe.

More specifically, because the base station can obtain the second CSI sent by the first terminal, the base station may estimate, according to the second CSI, the size of the second target data block that can be sent in the second subframe on the link between the first terminal and the second terminal, that is, the quantity of bits that can be sent by the second terminal in the second subframe.

309. The base station determines a size of a first target data block according to the first CSI and the size of the second target data block.

The first target data block is a downlink transmission data block transmitted on a resource allocated by the base station to the first terminal in a first subframe, and the second subframe is a subframe subsequent to the first subframe.

It should be understood that in this embodiment, a quantity of subframes between the first subframe and the second subframe is not limited.

More specifically, when scheduling a transport layer quantity, a time-frequency resource block, and a modulation coding rate of a link between the base station and the first terminal, the base station not only uses, as bases, a service requirement and the first CSI that is reported by the first terminal and that is of the link between the base station and the first terminal, but also needs to consider the quantity of bits that can be sent in the second subframe on the link between the first terminal and the second terminal, to ensure that a quantity of bits that can be sent in the first subframe on the link between the base station and the first terminal is slightly less than the quantity of bits that can be sent in the second subframe on the link between the first terminal and the second terminal.

310. The base station sends the first target data block to the first terminal in the first subframe.

311. The first terminal receives, in the first subframe, the first target data block sent by the base station.

Specifically, after receiving the first target data block in the first subframe, the first terminal may process the first target data block, to form the second target data block that is sent by the first terminal to the second terminal in the second subframe.

Optionally, when the first terminal receives the first target data block in the first subframe, if the first terminal determines that the quantity of bits transmitted on the first target data block is less than the quantity of bits transmitted on the second target data block, the first terminal performs null filling on the first target data block, to form the second target data block.

Specifically, the first terminal may mark, in the second target data block, a termination point of useful information in the second target data block.

312. The first terminal sends the second target data block to the second terminal in the second subframe.

313. The second terminal receives the second target data block in the second subframe.

In this embodiment, the first terminal sends the first CSI and the second CSI to the base station, and the base station may determine the size of the first target data block according to the first CSI and the second CSI, so that the determined quantity of bits transmitted on the second target data block is greater than or equal to the quantity of bits transmitted on the first target data block, and a rate of transmitting the first target data block in the first subframe is less than a rate of transmitting the second target data block in the second subframe. Therefore, a cache in the first terminal is effectively reduced, and a delay in sending the downlink data to the second terminal by the base station can be effectively reduced. In addition, both the link between the base station and the first terminal and the link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, the quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

The embodiment shown in FIG. 3A and FIG. 3B describes how the base station uses the first terminal to forward the downlink data to the second terminal. The following describes implementation of error retransmission with reference to FIG. 4A, FIG. 4B, and FIG. 4C.

Specifically, in a transmission process of the downlink data, the link between the base station and the first terminal and the link between the first terminal and the second terminal need to be successively passed through.

Optionally, a data error retransmission process can further be implemented in this embodiment, to effectively ensure that the second terminal can receive the downlink data sent by the base station.

Specifically, in this embodiment, an error retransmission process may be triggered because a transmission error occurs on the link between the base station and the first terminal, and/or a transmission error occurs on the link between the first terminal and the second terminal.

401. The second terminal sends, to the first terminal, a pilot signal that is used for channel estimation.

402. The first terminal receives the pilot signal from the second terminal, and generates the second CSI.

403. The first terminal determines the second CSI as the indication message.

404. The first terminal determines a size of a second target data block according to the second CSI.

405. The first terminal determines first channel state information CSI.

406. The first terminal sends the first CSI and the second CSI to the base station.

407. The base station receives the first CSI and the second CSI.

408. The base station estimates the size of the second target data block according to the second CSI.

409. The base station determines a size of a first target data block according to the first CSI and the size of the second target data block.

410. The base station sends the first target data block to the first terminal in the first subframe.

411. The first terminal receives, in the first subframe, the first target data block sent by the base station.

For a specific process of step 401 to step 411 in this embodiment, refer to step 301 to step 311 shown in FIG. 3A and FIG. 3B, and details are not described in this embodiment again.

412. The first terminal determines whether the second target data block is successfully received, where if the second target data block is successfully received, step 417 is performed; or if the second target data block is not successfully received, step 413 is performed.

413. The first terminal sends an indication message to the base station.

The indication message is used to indicate that the first terminal fails to receive the first target data block in the first subframe.

414. The base station regenerates the second target data block.

Specifically, the base station re-determines the second target data block according to the first CSI and the size of the second target data block.

415. The base station sends the regenerated second target data block to the first terminal.

Specifically, the base station sends the regenerated second target data block to the first terminal by using a subframe subsequent to the first subframe.

In this embodiment, the base station sends the regenerated second target data block by using a fourth subframe. The fourth subframe is a subframe subsequent to the first subframe, and the fourth subframe is a subframe prior to the second subframe. Specifically, a quantity of subframes between the first subframe and the fourth subframe, and a quantity of subframes between the second subframe and the fourth subframe are not limited in this embodiment.

416. If the first terminal determines that the regenerated second target data block is successfully received, continue to perform step 417.

Specifically, the second terminal performs an integrity check on received downlink data, to determine whether the regenerated second target data block is successfully received.

Specifically, how the second terminal performs the integrity check on the downlink data is pertinent to the prior art, and details are not described in this embodiment.

417. The first terminal sends the second target data block to the second terminal in the second subframe.

Specifically, the first terminal processes the received first target data block to form the second target data block sent to the second terminal.

More specifically, the second target data block may be a data block sent by the base station in the first subframe, or the second data block may be a data block sent by the base station by using the fourth subframe after the foregoing error retransmission process is performed.

418. The second terminal receives the second target data block in the second subframe.

The following describes implementation of an error transmission process for the link between the first terminal and the second terminal when a transmission error occurs on the link between the first terminal and the second terminal.

419. The first terminal receives a receive failure message sent by the second terminal.

The receive failure message is used to indicate that the second terminal fails to receive the second target data block in the second subframe.

420. The first terminal forwards the receive failure message to the base station.

The receive failure message is used to instruct the base station not to perform scheduling in a period of a third subframe, and the third subframe is a subframe subsequent to the second subframe.

421. The base station receives the receive failure message sent by the first terminal.

The receive failure message is used to instruct the base station not to perform scheduling in the period of the third subframe.

422. The base station determines, according to the receive failure message, not to perform resource scheduling in a period of a third subframe.

Because the base station does not perform resource scheduling in the period of the third subframe, the first terminal resends the second target data block to the second terminal in the third subframe.

423. The first terminal resends the second target data block to the second terminal in the third subframe.

424. The second terminal determines whether the second target data block is successfully received, where if the second target data block is not successfully received, step 419 to step 423 are repeatedly performed until the second terminal successfully receives the second target data block.

In this embodiment, the first terminal sends the first CSI and the second CSI to the base station, and the base station may determine the size of the first target data block according to the first CSI and the second CSI, so that the base station sends the first target data block to the first terminal by using the link between the base station and the first terminal, and the first terminal sends the second target data block to the second terminal by using the link between the first terminal and the second terminal. In addition, if a transmission error occurs on the link between the base station and the first terminal, and/or if a transmission error occurs on the link between the first terminal and the second terminal, error retransmission can be implemented, so that the base station can use the first terminal to successfully forward the downlink data to the second terminal. This effectively ensures successful transmission of the downlink data, effectively reduces a cache in the first terminal, and can effectively reduce a delay in sending the downlink data to the second terminal by the base station.

The embodiments shown in FIG. 3A and FIG. 3B and FIG. 4A, FIG. 4B, and FIG. 4C describe how data transmission is performed when the indication message is the second CSI. With reference to FIG. 5, the following describes in detail implementation of a data transmission method in which a downlink transmission rate from the base station to the first terminal matches a downlink transmission rate from the first terminal to the second terminal when the indication message is a rate change identifier.

501. The first terminal determines a rate change identifier.

The rate change identifier is used to indicate a rate change requirement on the downlink transmission rate from the base station to the first terminal.

Specifically, the first terminal obtains a length of to-be-transmitted data cached in the first terminal.

The first terminal may determine the rate change identifier according to the length of the to-be-transmitted data cached in the first terminal.

Optionally, the rate change identifier may be a signaling identifier.

Specifically, a length of the rate change identifier may be two bits.

For example, the signaling identifier may be:

00 to increase the rate by 100%

01 to increase the rate by 10%

10 to reduce the rate by 50%

11 to reduce the rate by 9%

It should be understood that the length of the rate change identifier is not limited in this embodiment.

502. The first terminal determines the rate change identifier as the indication message.

503. The first terminal determines first channel state information CSI.

504. The first terminal schedules a link between the first terminal and the second terminal.

Specifically, the first terminal schedules a modulation coding rate of the link between the first terminal and the second terminal, and a scheduling basis of the first terminal is CSI that is of the link between the first terminal and the second terminal and that is obtained by the first terminal by means of channel estimation.

Optionally, a time-frequency resource block of the link between the first terminal and the second terminal depends on a quasi-static resource pool preconfigured by the base station, but the first terminal may report a resource pool increase/reduction request to the base station according to a service requirement change, and then the base station performs reconfiguration by using control signaling.

In this embodiment, that a transport layer quantity is 1 is used as an example for description.

In this embodiment, there is no limitation on a time sequence between that the first terminal performs step 501 and step 502 and that the first terminal performs step 503 and step 504, and the foregoing description of the time sequence is merely an example.

505. The first terminal sends the first CSI and the rate change identifier to the base station.

506. The base station receives the first CSI and the rate change identifier.

507. The base station determines a size of a downlink transmission data block from the base station to the first terminal according to the first CSI and the rate change identifier.

508. The base station sends, to the first terminal, the downlink transmission data block from the base station to the first terminal in the first subframe.

509. The first terminal sends the downlink data block to the second terminal in a second subframe.

Specifically, after receiving the downlink transmission data block sent by the base station, the first terminal caches the downlink transmission data block, and sends the downlink transmission data block to the second terminal in the second subframe.

In this embodiment, the second subframe is a subframe subsequent to the first subframe, and a quantity of subframes between the first subframe and the second subframe is not limited in this embodiment.

In this embodiment, the base station adjusts the size of the downlink transmission data block from the base station to the first terminal according to the rate change identifier, so as to ensure that a value of the downlink transmission rate from the base station to the first terminal is less than or equal to a value of the downlink transmission rate from the first terminal to the second terminal.

Specifically, the base station determines the size of the downlink transmission data block from the base station to the first terminal according to the first CSI and the rate change identifier, so that a change of the downlink transmission rate from the base station to the first terminal meets the rate change requirement indicated by the rate change identifier, and the value of the downlink transmission rate from the base station to the first terminal is less than or equal to the value of the downlink transmission rate from the first terminal to the second terminal.

The base station changes the size of the downlink transmission data block from the base station to the first terminal, to reduce the length of the data cached in the first terminal.

For example, if the length of the data cached in the first terminal is relatively long, the first terminal uses the rate change identifier to indicate that the downlink transmission data block to be sent by the base station in the first subframe is relatively small, to reduce the downlink transmission rate from the base station to the first terminal.

For example, if the length of the data cached in the first terminal is relatively short, the first terminal uses the rate change identifier to indicate that the downlink transmission data block to be sent by the base station in the first subframe is relatively large, to increase the downlink transmission rate from the base station to the first terminal.

It can be learned that in this embodiment, when the base station schedules a link between the base station and the first terminal, the base station not only uses, as bases, a service requirement and the first CSI that is reported by the first terminal and that is of the link between the base station and the first terminal, but also needs to consider the rate change identifier reported by the first terminal. Therefore, the base station schedules a transport layer quantity, a time-frequency resource block, and a modulation coding rate of the link between the base station and the first terminal according to the service requirement, the first CSI, and the rate change identifier comprehensively.

In this embodiment, the first terminal sends the first CSI and the rate change identifier to the base station, and the base station determines the size of the downlink transmission data block from the base station to the first terminal according to the first CSI and the rate change identifier, so that the change of the downlink transmission rate from the base station to the first terminal meets the rate change requirement indicated by the rate change identifier, and the value of the downlink transmission rate from the base station to the first terminal is less than or equal to the value of the downlink transmission rate from the first terminal to the second terminal. Therefore, a cache in the first terminal is effectively reduced, and a delay in sending the downlink data to the second terminal by the base station can be effectively reduced. In addition, both the link between the base station and the first terminal and the link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 6:
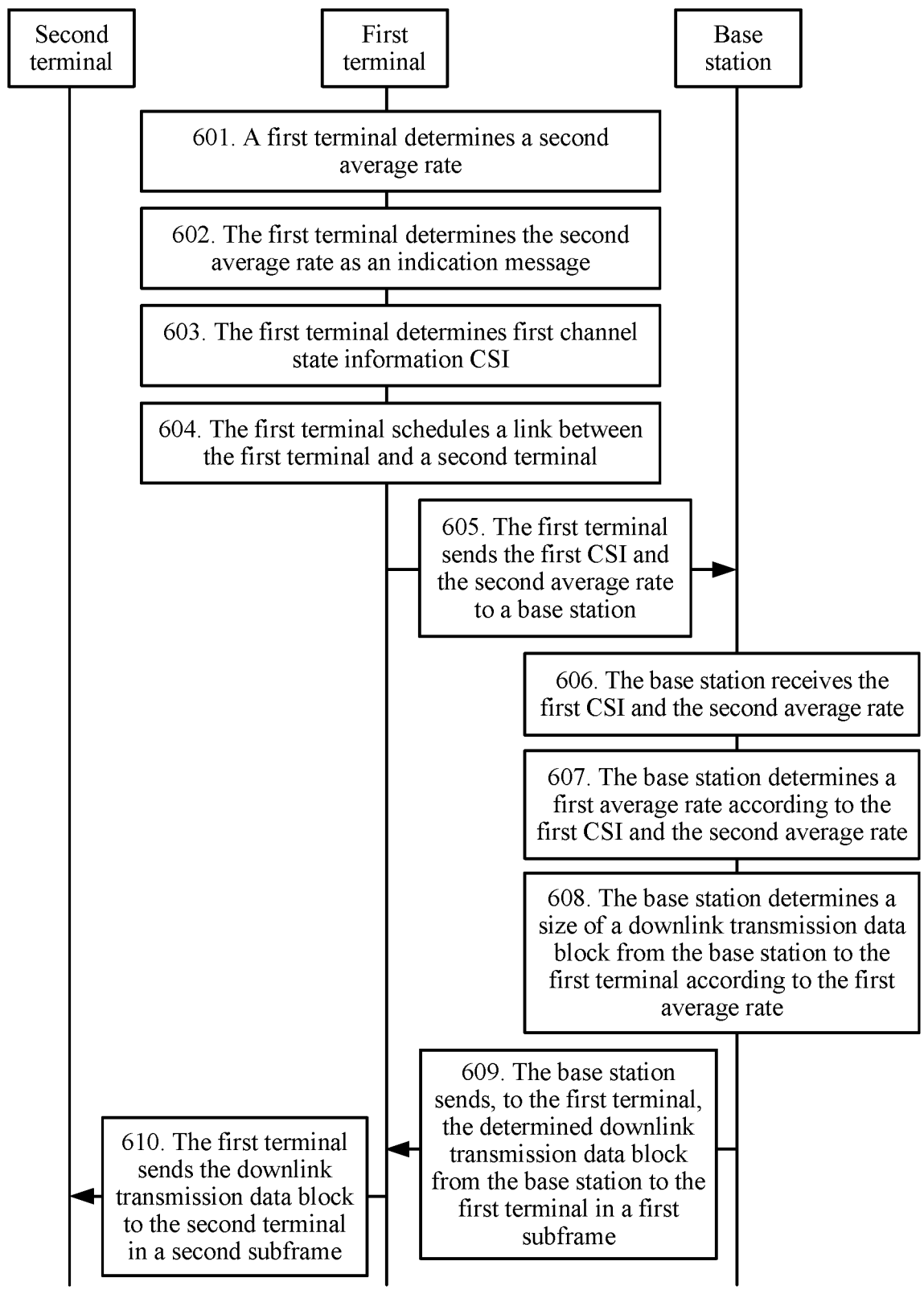
FIG. 6 is a further step flowchart of a data transmission method according to an embodiment of the present invention.

With reference to FIG. 6, the following describes in detail implementation of a data transmission method in which a downlink transmission rate from the base station to the first terminal matches a downlink transmission rate from the first terminal to the second terminal when the indication message is a second average rate.

601. The first terminal determines a second average rate.

The second average rate is an average rate at which the first terminal sends downlink data to the second terminal.

602. The first terminal determines the second average rate as the indication message.

The second average rate is used to trigger the base station to determine a first average rate according to the first CSI and the second average rate.

The first average rate is an average rate at which the base station sends the downlink data to the first terminal, and the first average rate is less than or equal to the second average rate. The first average rate is used to trigger the base station to determine a size of a downlink transmission data block from the base station to the first terminal according to the first average rate.

603. The first terminal determines first channel state information CSI.

604. The first terminal schedules a link between the first terminal and the second terminal.

For a specific process of step 603 and step 604 in this embodiment, refer to step 503 and step 504 shown in FIG. 5, and the specific process is not described in this embodiment.

In this embodiment, there is no limitation on a time sequence between that the first terminal performs step 601 and step 602 and that the first terminal performs step 603 and step 604, and the foregoing description of the time sequence is merely an example.

605. The first terminal sends the first CSI and the second average rate to the base station.

606. The base station receives the first CSI and the second average rate.

607. The base station determines a first average rate according to the first CSI and the second average rate.

The first average rate is the average rate at which the base station sends the downlink data to the first terminal, and the first average rate is less than or equal to the second average rate.

608. The base station determines a size of a downlink transmission data block from the base station to the first terminal according to the first average rate.

That is, the determined size of the downlink transmission data block from the base station to the first terminal is corresponding to the first average rate.

The base station determines the size of the downlink transmission data block from the base station to the first terminal, to ensure that the first average rate is less than or equal to the second average rate.

609. The base station sends, to the first terminal, the determined downlink transmission data block from the base station to the first terminal in a first subframe.

610. The first terminal sends the downlink transmission data block to the second terminal in a second subframe.

The second subframe is a subframe subsequent to the first subframe, and a quantity of subframes between the first subframe and the second subframe is not limited in this embodiment.

In this embodiment, the first terminal sends the first CSI and the second average rate to the base station, and the base station determines the size of the downlink transmission data block from the base station to the first terminal according to the first CSI and the second average rate, to ensure that the first average rate is less than or equal to the second average rate. Therefore, a cache in the first terminal is effectively reduced, and a delay in sending the downlink data to the second terminal by the base station can be effectively reduced. In addition, both a link between the base station and the first terminal and the link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 7:
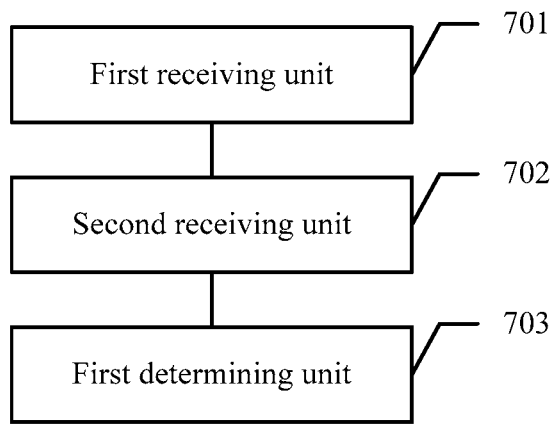
FIG. 7 is a schematic structural diagram of a base station according to an embodiment of the present invention.

With reference to FIG. 7, the following describes a specific structure of the base station used for implementing the embodiment shown in FIG. 1.

The base station includes:

a first receiving unit 701, configured to receive first channel state information CSI sent by a first terminal, where the first CSI is CSI between the base station and the first terminal;

a second receiving unit 702, configured to receive an indication message sent by the first terminal; and a first determining unit 703, configured to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the base station determines the size of the downlink transmission data block from the base station to the first terminal, so that the downlink transmission rate from the base station to the first terminal matches the downlink transmission rate from the first terminal to the second terminal. Therefore, a cache in the first terminal is reduced, and a delay in sending the downlink data to the second terminal by the base station can be effectively reduced. In addition, the second terminal is visible to a core network, so that the core network can monitor quality of service QoS in a centralized manner.

Figure 8:
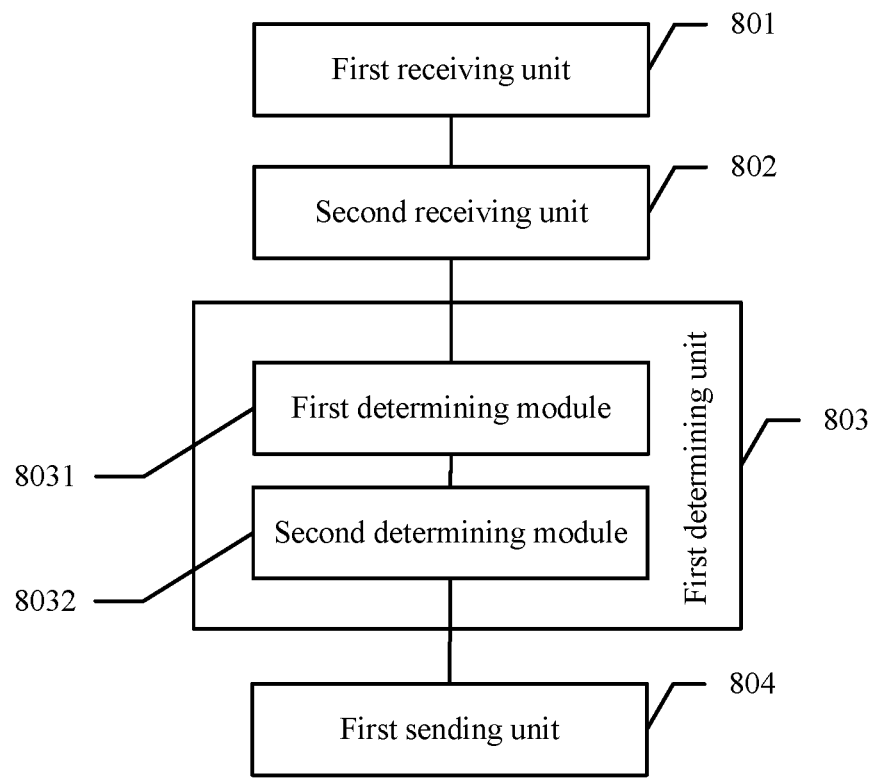
FIG. 8 is another schematic structural diagram of a base station according to an embodiment of the present invention.

With reference to an embodiment shown in FIG. 8, the following describes a specific structure of the base station when the indication message is CSI between the first terminal and the second terminal.

The base station includes:

a first receiving unit 801, configured to receive first channel state information CSI sent by a first terminal, where the first CSI is CSI between the base station and the first terminal;

a second receiving unit 802, configured to receive an indication message sent by the first terminal; and a first determining unit 803, configured to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the indication message is second CSI, and the second CSI is the CSI between the first terminal and the second terminal.

For a specific step of obtaining the second CSI, refer to the embodiment shown in FIG. 3A and FIG. 3B, and details are not described in this embodiment again.

Specifically, the first determining unit 803 includes:

a first determining module 8031, configured to estimate a size of a second target data block according to the second CSI, where the second target data block is a downlink transmission data block transmitted on a resource allocated by the first terminal to the second terminal in a second subframe; and a second determining module 8032, configured to determine a size of a first target data block according to the first CSI and the size of the second target data block, where the first target data block is a downlink transmission data block transmitted on a resource allocated by the base station to the first terminal in a first subframe, a quantity of bits transmitted on the first target data block is less than or equal to a quantity of bits transmitted on the second target data block, and the second subframe is a subframe subsequent to the first subframe.

The base station further includes:

a first sending unit 804, configured to send the first target data block to the first terminal in the first subframe.

In this embodiment, the first terminal sends the first CSI and the second CSI to the base station, and the base station may determine the size of the first target data block according to the first CSI and the second CSI, so that the determined quantity of bits transmitted on the second target data block is greater than or equal to the quantity of bits transmitted on the first target data block, and a rate of transmitting the first target data block in the first subframe is less than a rate of transmitting the second target data block in the second subframe. Therefore, a cache in the first terminal is effectively reduced, and a delay in sending the downlink data to the second terminal by the base station can be effectively reduced. In addition, both a link between the base station and the first terminal and a link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, the quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 9:
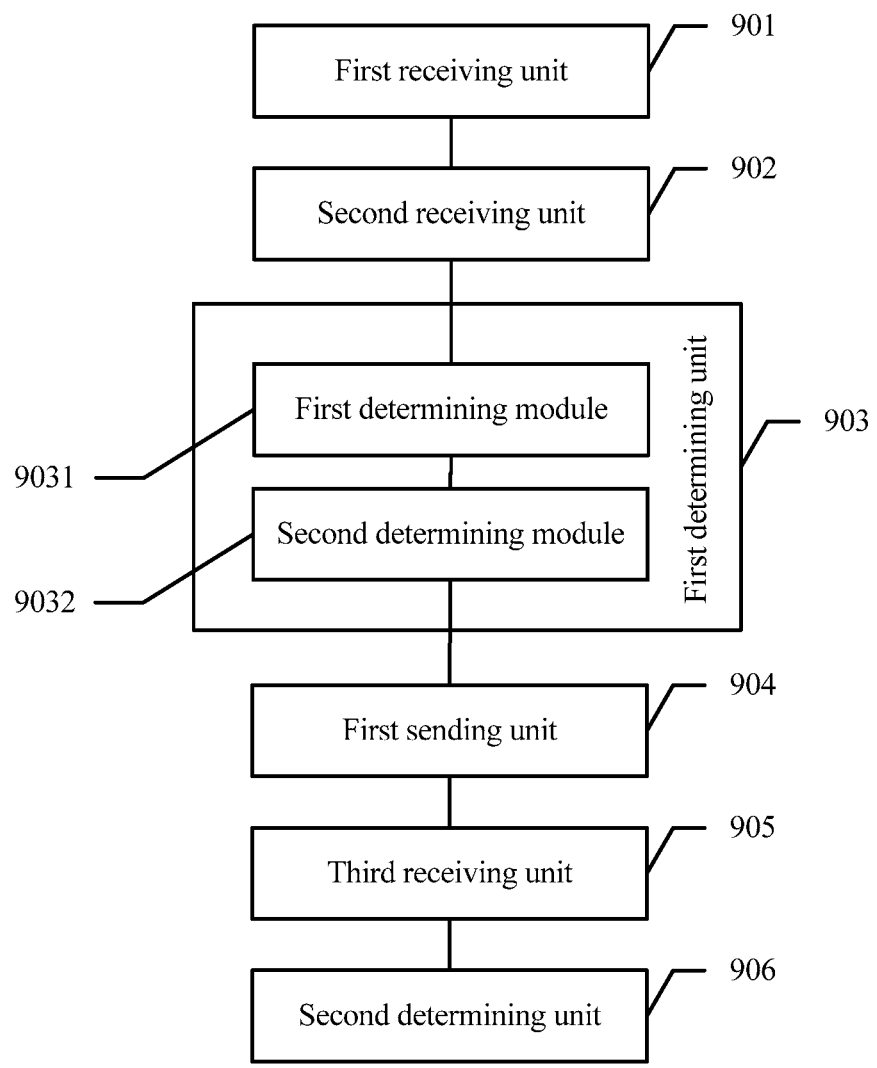
FIG. 9 is still another schematic structural diagram of a base station according to an embodiment of the present invention.

With reference to an embodiment shown in FIG. 9, the following describes a specific structure of the base station that can implement error retransmission.

The base station includes: a first receiving unit 901, a second receiving unit 902, a first determining unit 903, a first sending unit 904, a third receiving unit 905, and a second determining unit 906.

The first receiving unit 901 is configured to receive first channel state information CSI sent by a first terminal, where the first CSI is CSI between the base station and the first terminal.

The second receiving unit 902 is configured to receive an indication message sent by the first terminal.

The first determining unit 903 is configured to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the indication message is second CSI, and the second CSI is CSI between the first terminal and the second terminal.

Specifically, the first determining unit 903 includes:

a first determining module 9031, configured to estimate a size of a second target data block according to the second CSI, where the second target data block is a downlink transmission data block transmitted on a resource allocated by the first terminal to the second terminal in a second subframe; and a second determining module 9032, configured to determine a size of a first target data block according to the first CSI and the size of the second target data block, where the first target data block is a downlink transmission data block transmitted on a resource allocated by the base station to the first terminal in a first subframe, a quantity of bits transmitted on the first target data block is less than or equal to a quantity of bits transmitted on the second target data block, and the second subframe is a subframe subsequent to the first subframe.

The first sending unit 904 is configured to send the first target data block to the first terminal in the first subframe.

The third receiving unit 905 is configured to receive a receive failure message sent by the first terminal, where the receive failure message is used to instruct the base station not to perform scheduling in a period of a third subframe, the third subframe is a subframe subsequent to the second subframe, and the receive failure message is used to indicate that the second terminal fails to receive the second target data block in the second subframe.

The second determining unit 906 is configured to determine, according to the receive failure message, that resource scheduling is not to be performed in the period of the third subframe.

Figure 4A:
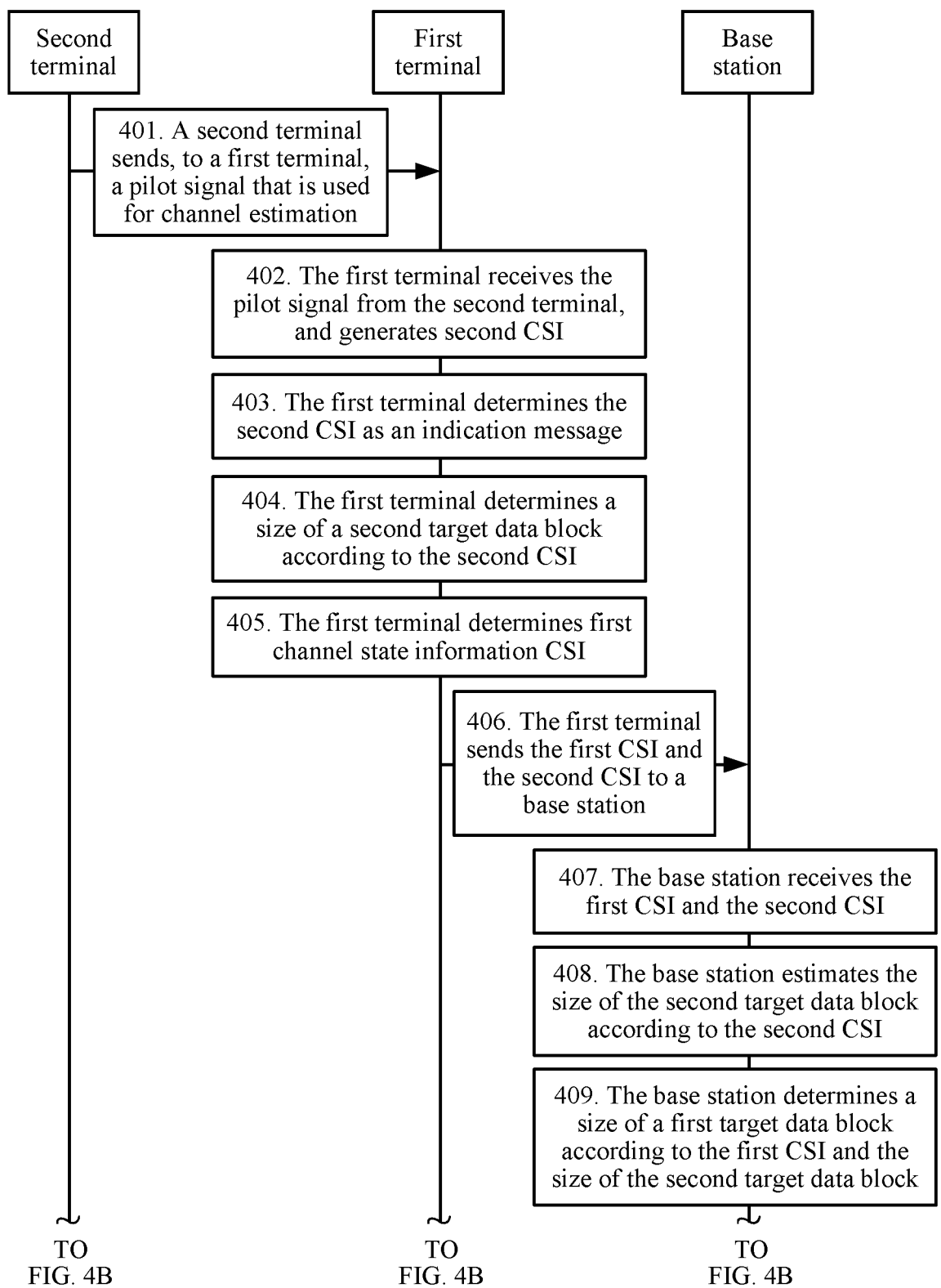
FIG. 4A, FIG. 4B, and FIG. 4C are yet another step flowchart of a data transmission method according to an embodiment of the present invention.
Figure 4B:
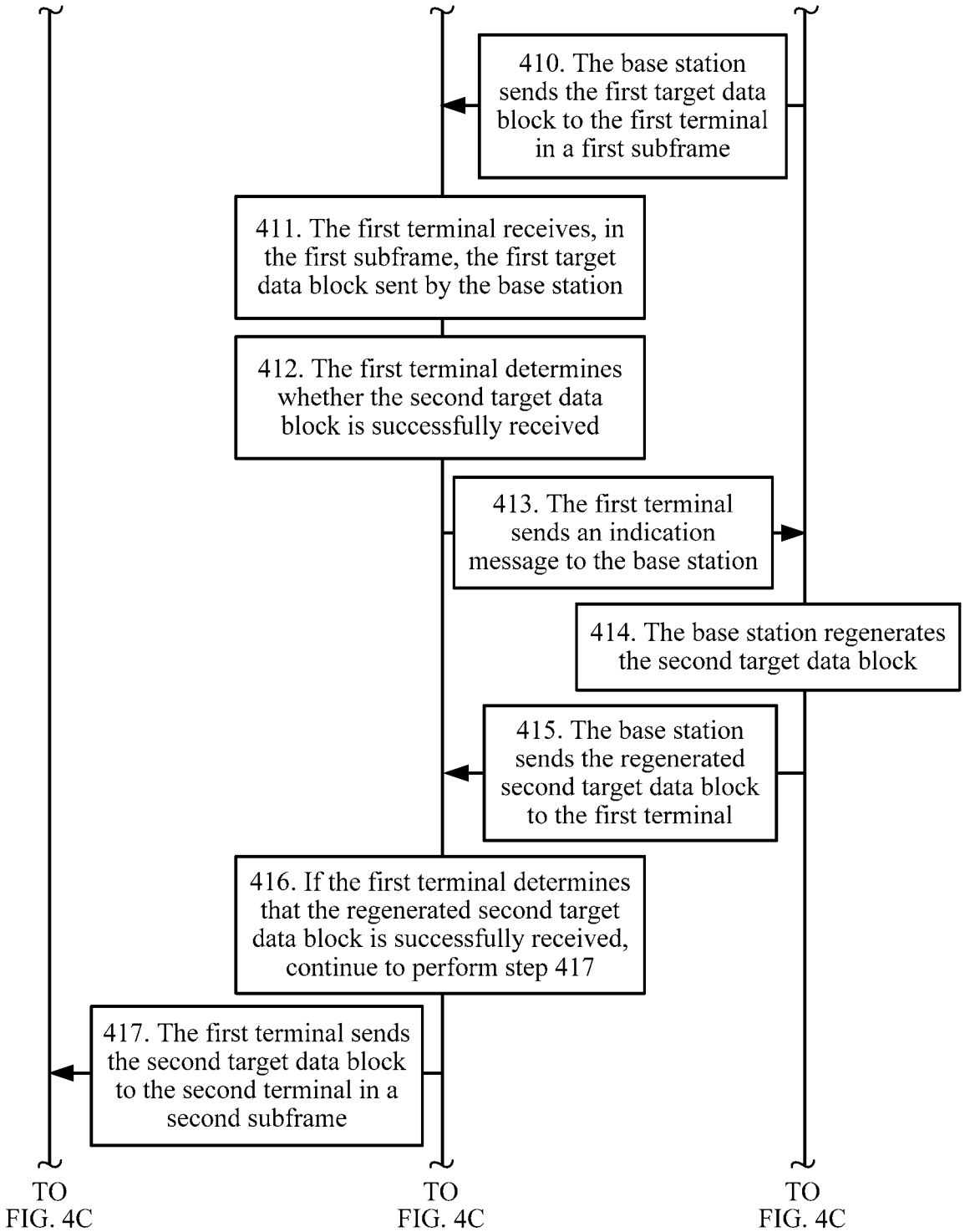
Figure 4C:
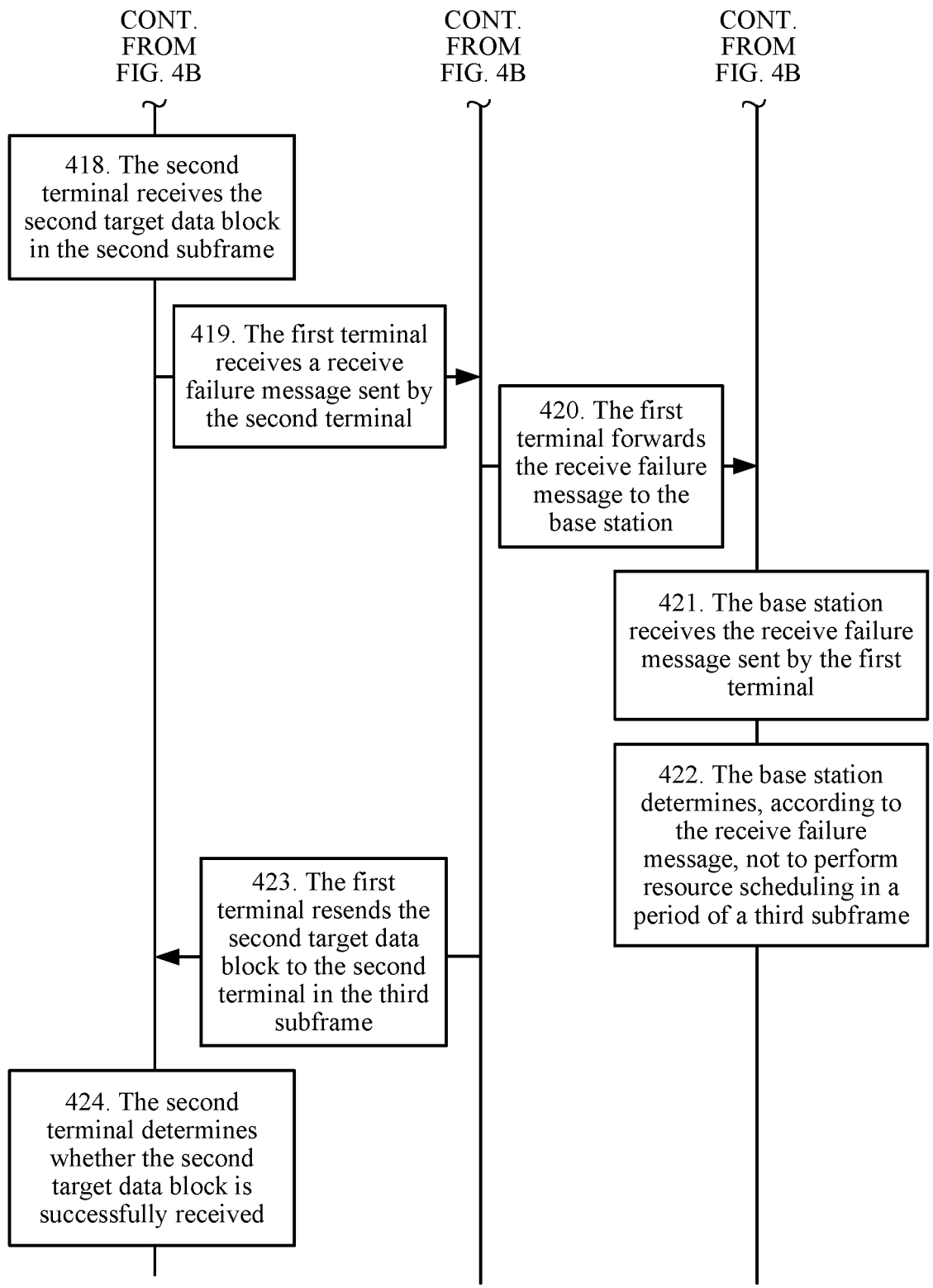
Figure 5:
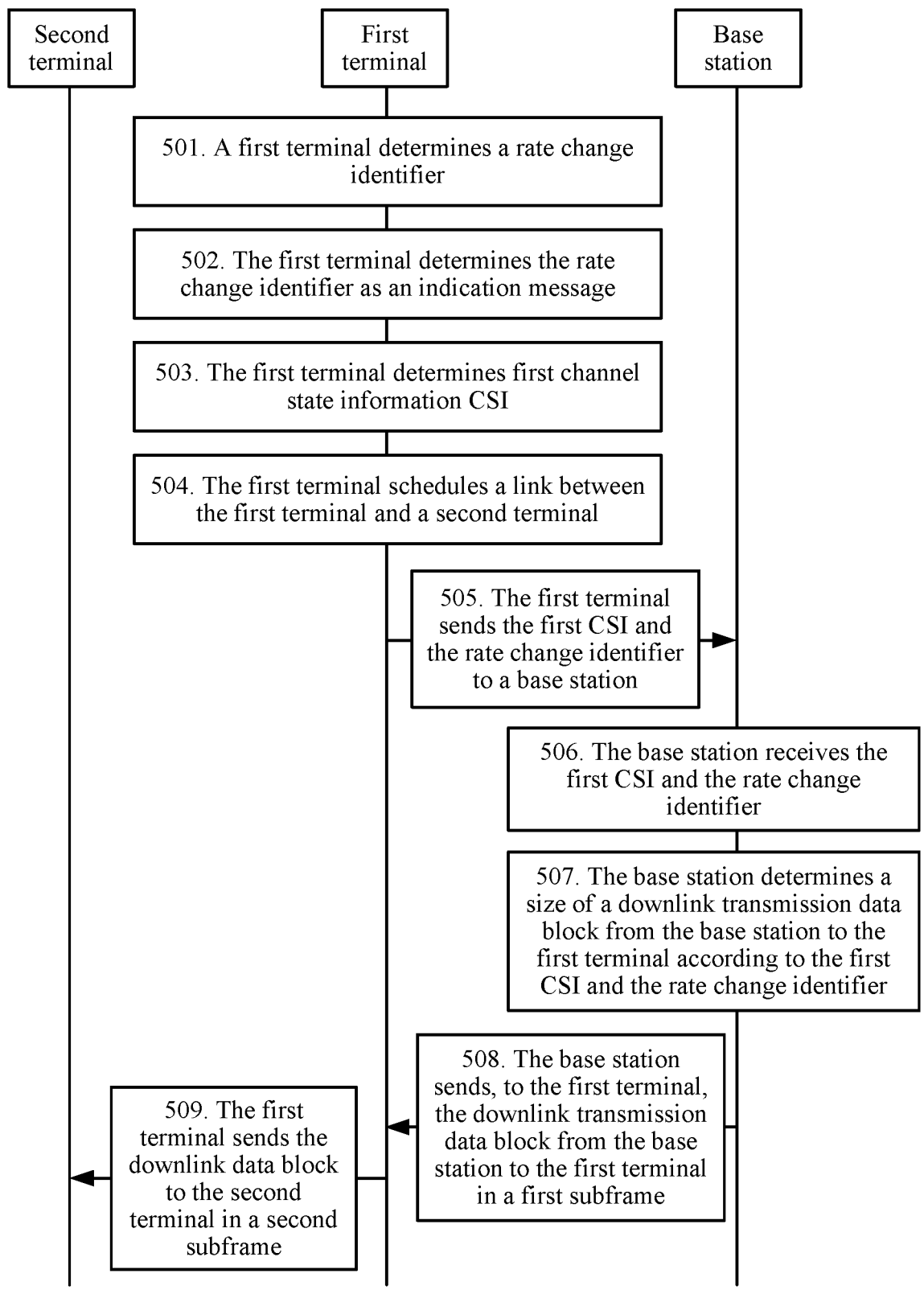
FIG. 5 is still yet another step flowchart of a data transmission method according to an embodiment of the present invention.

For a specific step of performing an error retransmission process shown in this embodiment, refer to the embodiment shown in FIG. 4A, FIG. 4B, and FIG. 4C, and details are not described in this embodiment again.

In this embodiment, the first terminal sends the first CSI and the second CSI to the base station, and the base station may determine the size of the first target data block according to the first CSI and the second CSI, so that the base station sends the first target data block to the first terminal by using a link between the base station and the first terminal, and the first terminal sends the second target data block to the second terminal by using a link between the first terminal and the second terminal. In addition, if a transmission error occurs on the link between the base station and the first terminal, error retransmission can be implemented, so that the base station can use the first terminal to successfully forward the downlink data to the second terminal. This effectively ensures successful transmission of the downlink data, effectively reduces a cache in the first terminal, and can effectively reduce a delay in sending the downlink data to the second terminal by the base station.

Figure 10:
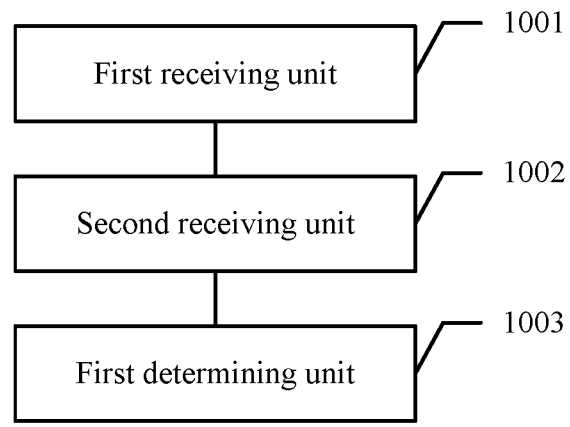
FIG. 10 is yet another schematic structural diagram of a base station according to an embodiment of the present invention.

With reference to an embodiment shown in FIG. 10, the following describes a specific structure of the base station when the indication message is a rate change identifier.

The base station includes:

a first receiving unit 1001, configured to receive first channel state information CSI sent by a first terminal, where the first CSI is CSI between the base station and the first terminal;

a second receiving unit 1002, configured to receive an indication message sent by the first terminal; and a first determining unit 1003, configured to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the indication message is a rate change identifier, and the rate change identifier is used to indicate a rate change requirement on the downlink transmission rate from the base station to the first terminal.

For details about how to determine the rate change identifier, refer to the embodiment shown in FIG. 5, and details are not described in this embodiment again.

The first determining unit 1003 is further configured to determine the size of the downlink transmission data block from the base station to the first terminal according to the first CSI and the rate change identifier, where a change of the downlink transmission rate from the base station to the first terminal meets the rate change requirement indicated by the rate change identifier, so that a value of the downlink transmission rate from the base station to the first terminal is less than or equal to a value of the downlink transmission rate from the first terminal to the second terminal.

In this embodiment, the first terminal sends the first CSI and the rate change identifier to the base station, and the base station determines the size of the downlink transmission data block from the base station to the first terminal according to the first CSI and the rate change identifier, so that the change of the downlink transmission rate from the base station to the first terminal meets the rate change requirement indicated by the rate change identifier, and the value of the downlink transmission rate from the base station to the first terminal is less than or equal to the value of the downlink transmission rate from the first terminal to the second terminal. Therefore, a cache in the first terminal is effectively reduced, and a delay in sending the downlink data to the second terminal by the base station can be effectively reduced. In addition, both the link between the base station and the first terminal and the link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 11:
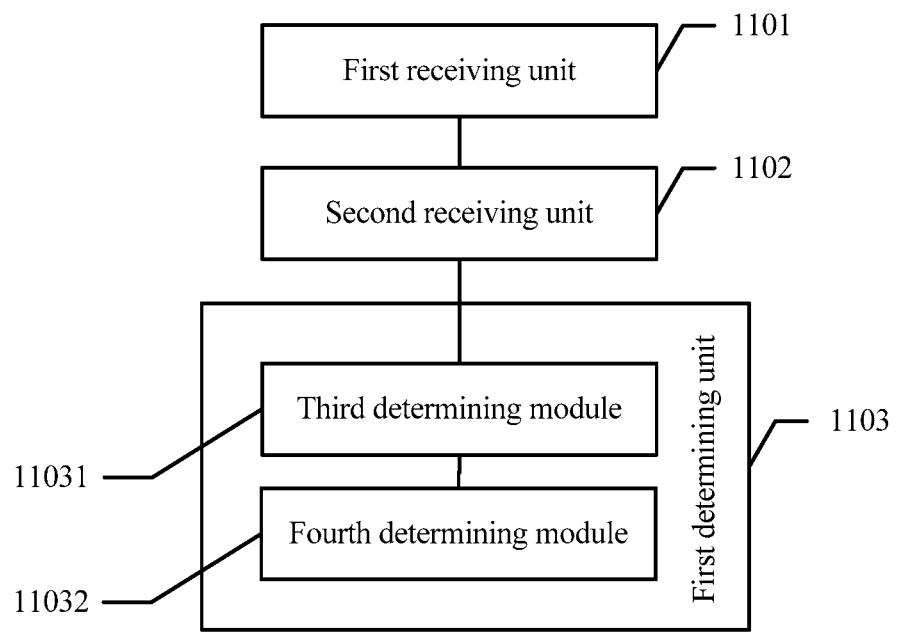
FIG. 11 is still yet another schematic structural diagram of a base station according to an embodiment of the present invention.

With reference to an embodiment shown in FIG. 11, the following describes a specific structure of the base station when the indication message is a second average rate.

The base station includes:

a first receiving unit 1101, configured to receive first channel state information CSI sent by a first terminal, where the first CSI is CSI between the base station and the first terminal;

a second receiving unit 1102, configured to receive an indication message sent by the first terminal; and a first determining unit 1103, configured to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the indication message is a second average rate, and the second average rate is an average rate at which the first terminal sends the downlink data to the second terminal.

For details about how to determine the second average rate, refer to the embodiment shown in FIG. 6, and details are not described in this embodiment again.

Specifically, the first determining unit 1103 includes:

a third determining module 11031, configured to determine a first average rate according to the first CSI and the second average rate, where the first average rate is an average rate at which the base station sends the downlink data to the first terminal, and the first average rate is less than or equal to the second average rate; and a fourth determining module 11032, configured to determine the size of the downlink transmission data block from the base station to the first terminal according to the first average rate, where the average rate at which the base station sends the downlink data to the first terminal is the first average rate.

In this embodiment, the first terminal sends the first CSI and the second average rate to the base station, and the base station determines the size of the downlink transmission data block from the base station to the first terminal according to the first CSI and the second average rate, to ensure that the first average rate is less than or equal to the second average rate. Therefore, a cache in the first terminal is effectively reduced, and a delay in sending the downlink data to the second terminal by the base station can be effectively reduced. In addition, both a link between the base station and the first terminal and a link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 12:
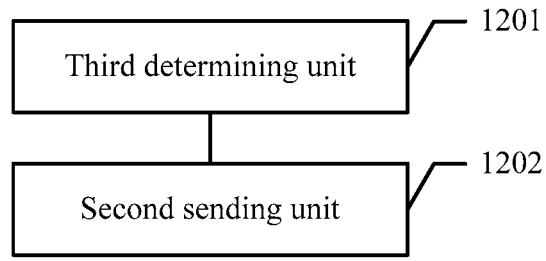
FIG. 12 is a schematic structural diagram of a first terminal according to an embodiment of the present invention.

With reference to FIG. 12, the following describes a specific structure of the first terminal used for implementing the embodiment shown in FIG. 2.

The first terminal includes:

a third determining unit 1201, configured to determine first channel state information CSI and an indication message; and a second sending unit 1202, configured to send the first channel state information CSI and the indication message to a base station, where the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

In this embodiment, the first terminal sends the first CSI and the indication message to the base station, and the base station determines the size of the downlink transmission data block from the base station to the first terminal, so that the downlink transmission rate from the base station to the first terminal matches the downlink transmission rate from the first terminal to the second terminal. Therefore, a cache in the first terminal is reduced, and efficiency of forwarding, by the first terminal to the second terminal, the downlink data sent by the base station is effectively improved. In addition, the second terminal is visible to a core network, so that the core network can monitor quality of service QoS in a centralized manner.

Figure 13:
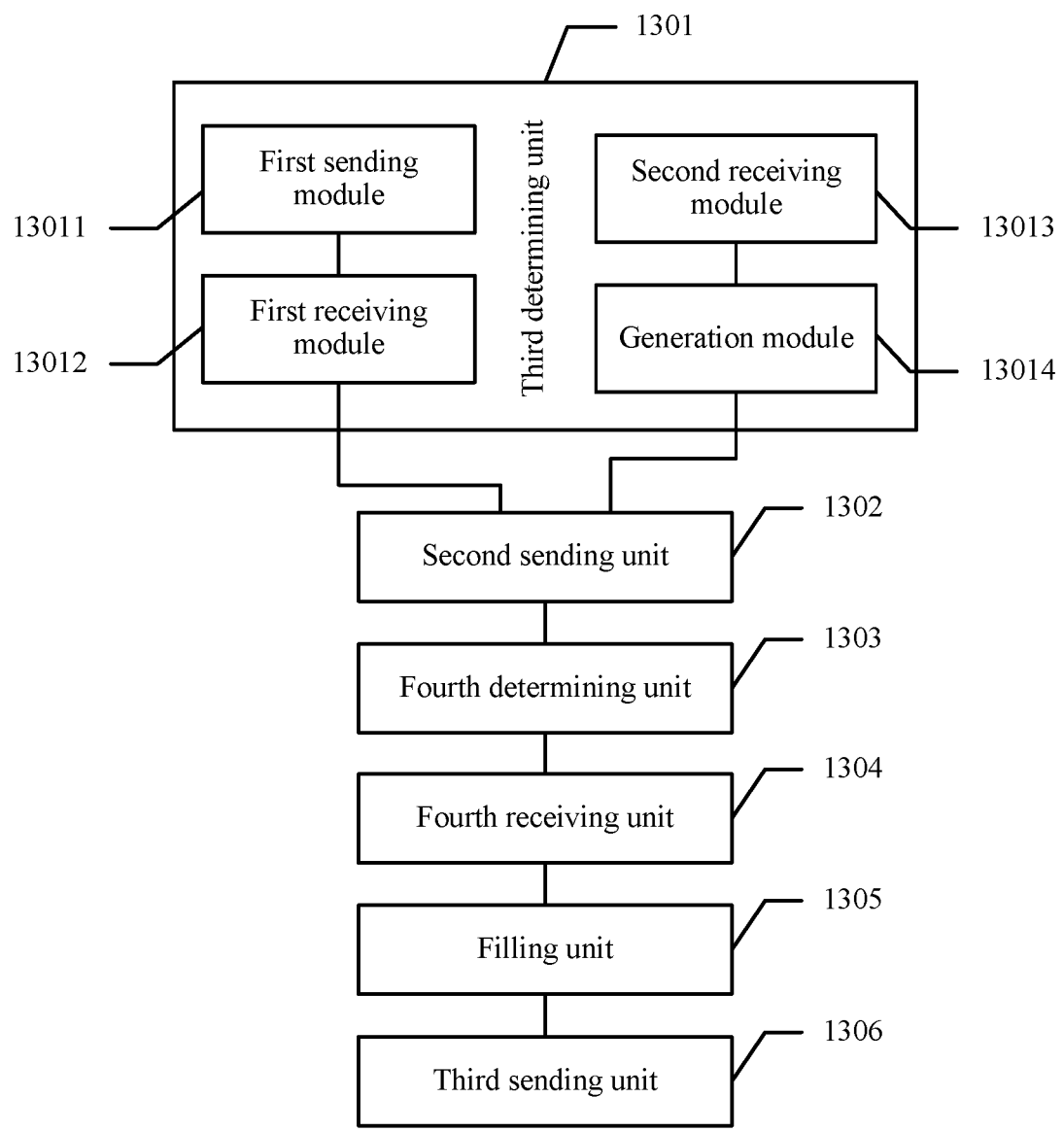
FIG. 13 is another schematic structural diagram of a first terminal according to an embodiment of the present invention.

With reference to an embodiment shown in FIG. 13, the following describes a specific structure of the first terminal when the indication message is CSI between the first terminal and the second terminal. The first terminal includes: a third determining unit 1301, a second sending unit 1302, a fourth determining unit 1303, and a fourth receiving unit 1304.

The third determining unit 1301 is configured to determine first channel state information CSI and an indication message.

Specifically, in this embodiment, the indication message is second CSI, and the second CSI is the CSI between the first terminal and the second terminal.

The second sending unit 1302 is configured to send the first channel state information CSI and the indication message to a base station, where the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

The fourth determining unit 1303 is configured to determine a size of a second target data block according to the second CSI, where the second target data block is a downlink transmission data block transmitted on a resource allocated by the first terminal to the second terminal in a second subframe.

The fourth receiving unit 1304 is configured to receive, in a first subframe, a first target data block sent by the base station, where the first target data block is a downlink transmission data block transmitted on a resource allocated by the base station to the first terminal in the first subframe, a quantity of bits transmitted on the first target data block is less than or equal to a quantity of bits transmitted on the second target data block, and the second subframe is a subframe subsequent to the first subframe.

Optionally, if the quantity of bits transmitted on the first target data block is less than the quantity of bits transmitted on the second target data block, the first terminal may include:

a filling unit 1305, configured to perform null filling on the first target data block, to form the second target data block; and a third sending unit 1306, configured to send the second target data block to the second terminal in the second subframe.

Specifically, the third determining unit 1301 includes:

a first sending module 13011, configured to send, to the second terminal, a pilot signal that is used for channel estimation; and a first receiving module 13012, configured to receive the second CSI generated by the second terminal according to the pilot signal; or a second receiving module 13013, configured to receive a pilot signal that is used for channel estimation and sent by the second terminal; and a generation module 13014, configured to perform channel estimation and generate the second CSI according to the pilot signal.

In this embodiment, the first terminal sends the first CSI and the second CSI to the base station, and the base station may determine the size of the first target data block according to the first CSI and the second CSI, so that the determined quantity of bits transmitted on the second target data block is greater than or equal to the quantity of bits transmitted on the first target data block, and a rate of transmitting the first target data block in the first subframe is less than a rate of transmitting the second target data block in the second subframe. Therefore, a cache in the first terminal is effectively reduced, and a delay in sending the downlink data to the second terminal by the base station can be effectively reduced. In addition, both a link between the base station and the first terminal and a link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, the quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Figure 14:
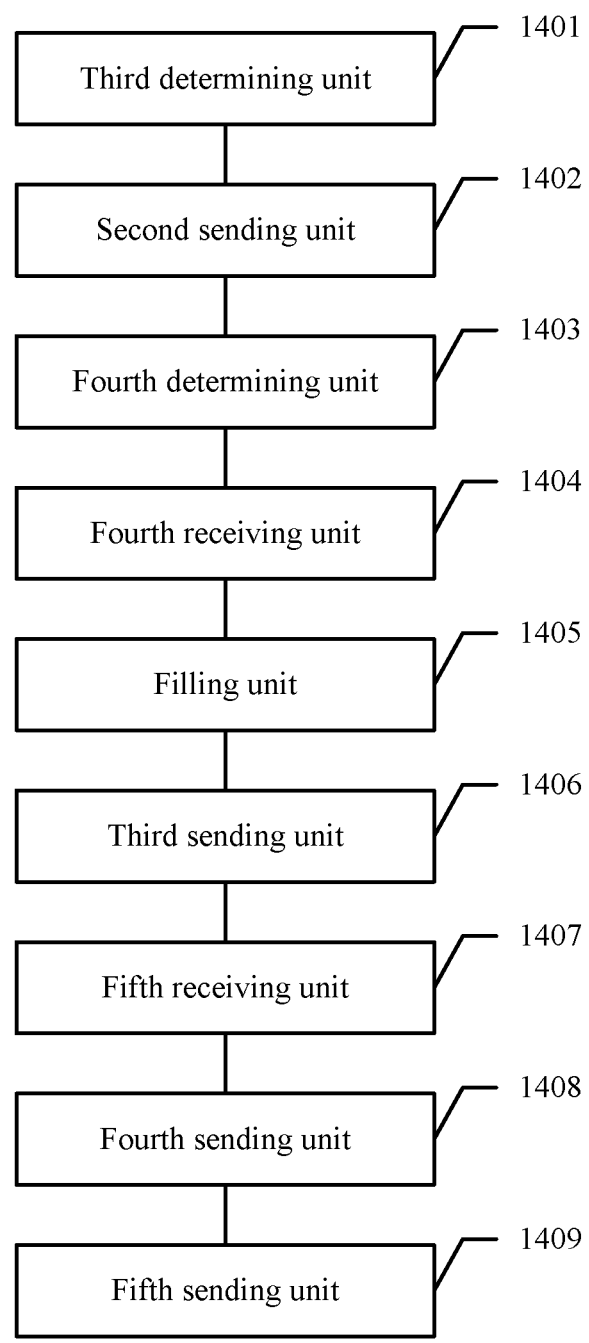
FIG. 14 is still another schematic structural diagram of a first terminal according to an embodiment of the present invention.

With reference to an embodiment shown in FIG. 14, the following describes a specific structure of the first terminal that can implement error retransmission. The first terminal includes: a third determining unit 1401, a second sending unit 1402, a fourth determining unit 1403, and a fourth receiving unit 1404.

The third determining unit 1401 is configured to determine first channel state information CSI and an indication message.

Specifically, in this embodiment, the indication message is second CSI, and the second CSI is CSI between the first terminal and the second terminal.

The second sending unit 1402 is configured to send the first channel state information CSI and the indication message to a base station, where the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

The fourth determining unit 1403 is configured to determine a size of a second target data block according to the second CSI, where the second target data block is a downlink transmission data block transmitted on a resource allocated by the first terminal to the second terminal in a second subframe.

The fourth receiving unit 1404 is configured to receive, in a first subframe, a first target data block sent by the base station, where the first target data block is a downlink transmission data block transmitted on a resource allocated by the base station to the first terminal in the first subframe, a quantity of bits transmitted on the first target data block is less than or equal to a quantity of bits transmitted on the second target data block, and the second subframe is a subframe subsequent to the first subframe.

Optionally, if the quantity of bits transmitted on the first target data block is less than the quantity of bits transmitted on the second target data block, the first terminal may include: a filling unit 1405, a third sending unit 1406, a fifth receiving unit 1407, a fourth sending unit 1408, and a fifth sending unit 1409.

The filling unit 1405 is configured to perform null filling on the first target data block, to form the second target data block.

The third sending unit 1406 is configured to send the second target data block to the second terminal in the second subframe.

The fifth receiving unit 1407 is configured to receive a receive failure message sent by the second terminal.

Specifically, the receive failure message is used to indicate that the second terminal fails to receive the second target data block in the second subframe.

The fourth sending unit 1408 is configured to forward the receive failure message to the base station, where the receive failure message is used to instruct the base station not to perform scheduling in a period of a third subframe, and the third subframe is a subframe subsequent to the second subframe.

The fifth sending unit 1409 is configured to resend the second target data block to the second terminal in the third subframe.

For a specific step of performing an error retransmission process shown in this embodiment, refer to the embodiment shown in FIG. 4A, FIG. 4B, and FIG. 4C, and details are not described in this embodiment again.

In this embodiment, the first terminal sends the first CSI and the second CSI to the base station, and the base station may determine the size of the first target data block according to the first CSI and the second CSI, so that the base station sends the first target data block to the first terminal by using a link between the base station and the first terminal, and the first terminal sends the second target data block to the second terminal by using a link between the first terminal and the second terminal. In addition, if a transmission error occurs on the link between the base station and the first terminal, error retransmission can be implemented, so that the base station can use the first terminal to successfully forward the downlink data to the second terminal. This effectively ensures successful transmission of the downlink data, effectively reduces a cache in the first terminal, and can effectively reduce a delay in sending the downlink data to the second terminal by the base station.

Still referring to FIG. 12, the following describes a specific structure of the first terminal when the indication message is a rate change identifier.

The first terminal includes: a third determining unit 1201 and a second sending unit 1202.

The third determining unit 1201 is configured to determine first channel state information CSI and an indication message.

In this embodiment, the indication message is a rate change identifier, the rate change identifier is used to indicate a rate change requirement on a downlink transmission rate from the base station to the first terminal, and the rate change identifier is used to trigger the base station to determine a size of a downlink transmission data block from the base station to the first terminal according to the first CSI and the rate change identifier, so that a change of the downlink transmission rate from the base station to the first terminal meets the rate change requirement indicated by the rate change identifier, and a value of the downlink transmission rate from the base station to the first terminal is less than or equal to a value of a downlink transmission rate from the first terminal to a second terminal.

In this embodiment, the third determining unit 1201 is further configured to determine the rate change identifier according to a length of transmitted data cached in the first terminal.

The second sending unit 1202 is configured to send the first channel state information CSI and the indication message to the base station, where the first CSI is CSI between the base station and the first terminal, and the first CSI and the indication message are used to trigger the base station to determine the size of the downlink transmission data block from the base station to the first terminal according to the first CSI and the indication message, where the downlink transmission rate from the base station to the first terminal matches the downlink transmission rate from the first terminal to the second terminal, and the first terminal is configured to forward, to the second terminal, downlink data sent by the base station.

In this embodiment, the first terminal sends the first CSI and the rate change identifier to the base station, and the base station determines the size of the downlink transmission data block from the base station to the first terminal according to the first CSI and the rate change identifier, so that the change of the downlink transmission rate from the base station to the first terminal meets the rate change requirement indicated by the rate change identifier, and the value of the downlink transmission rate from the base station to the first terminal is less than or equal to the value of the downlink transmission rate from the first terminal to the second terminal. Therefore, a cache in the first terminal is effectively reduced, and a delay in sending the downlink data to the second terminal by the base station can be effectively reduced. In addition, both a link between the base station and the first terminal and a link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

Still referring to FIG. 12, the following describes a specific structure of the first terminal when the indication message is a second average rate.

The first terminal includes: a third determining unit 1201 and a second sending unit 1202.

The third determining unit 1201 is configured to determine first channel state information CSI and an indication message.

In this embodiment, the indication message is a second average rate, the second average rate is an average rate at which the first terminal sends downlink data to the second terminal, and the second average rate is used to trigger the base station to determine a first average rate according to the first CSI and the second average rate, where the first average rate is an average rate at which the base station sends the downlink data to the first terminal, the first average rate is less than or equal to the second average rate, and the first average rate is used to trigger the base station to determine a size of a downlink transmission data block from the base station to the first terminal according to the first average rate.

The second sending unit 1202 is configured to send the first channel state information CSI and the indication message to the base station, where the first CSI is CSI between the base station and the first terminal, and the first CSI and the indication message are used to trigger the base station to determine the size of the downlink transmission data block from the base station to the first terminal according to the first CSI and the indication message, where a downlink transmission rate from the base station to the first terminal matches a downlink transmission rate from the first terminal to the second terminal, and the first terminal is configured to forward, to the second terminal, the downlink data sent by the base station.

In this embodiment, the first terminal sends the first CSI and the second average rate to the base station, and the base station determines the size of the downlink transmission data block from the base station to the first terminal according to the first CSI and the second average rate, to ensure that the first average rate is less than or equal to the second average rate. Therefore, a cache in the first terminal is effectively reduced, and a delay in sending the downlink data to the second terminal by the base station can be effectively reduced. In addition, both a link between the base station and the first terminal and a link between the first terminal and the second terminal are coupled on a physical layer and a MAC layer, and the downlink transmission rate from the base station to the first terminal matches the downlink transmission rate from the first terminal to the second terminal by means of transmitting control information. In a matching process, a quantity of bits transmitted on the first target data block is adjusted according to the first CSI and the second CSI, so as to adapt to a channel quality change in real time in a transmission process. In addition, the second terminal is visible to a core network, so that QoS of a service can be ensured.

In the embodiments shown in FIG. 7 to FIG. 11, a specific structure of a base station is described from a perspective of a function module. The following describes the specific structure of the base station from a perspective of hardware with reference to an embodiment shown in FIG. 15.

Figure 15:
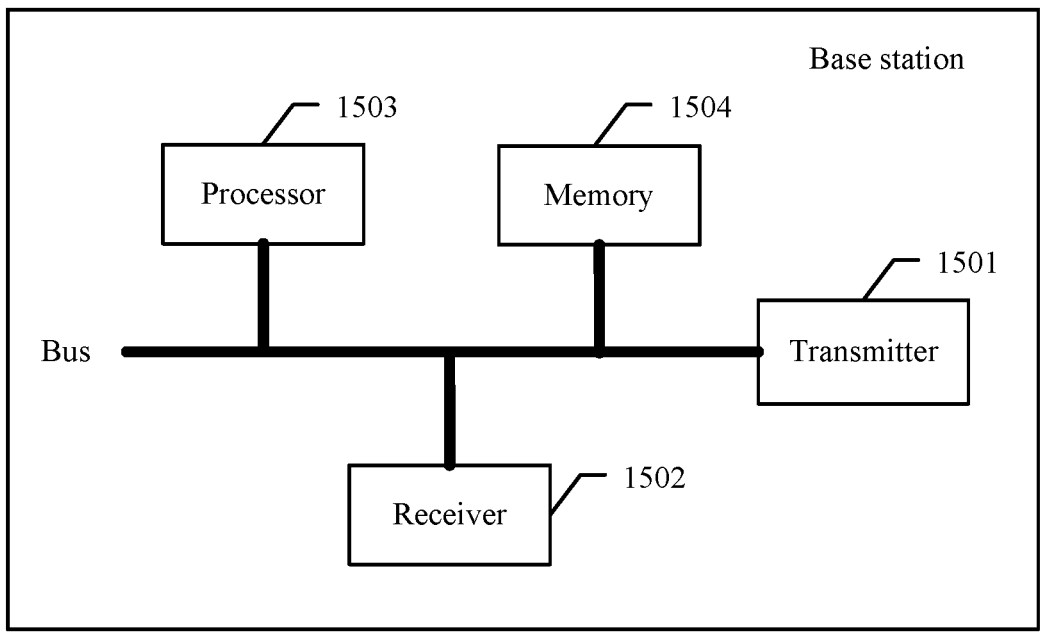
FIG. 15 is a further schematic structural diagram of a base station according to an embodiment of the present invention.

As shown in FIG. 15, the base station includes: a transmitter 1501, a receiver 1502, a processor 1503, and a memory 1504. There may be one or more processors 1503, and one processor is used as an example for description in this embodiment.

In addition, in this embodiment, the transmitter 1501, the receiver 1502, and the memory 1504 are connected to the processor 1503 by using a bus. Certainly, another connection manner may be used, and a specific connection manner is not limited in this embodiment.

The base station used in this embodiment of the present invention may have more or fewer components than those shown in FIG. 15, may combine two or more components, or may have different component configurations or settings. Various components may be implemented by hardware including one or more signal processing and/or application-specific integrated circuits, by software, or by a combination of hardware and software.

The receiver 1502 is configured to receive first channel state information CSI sent by a first terminal, where the first CSI is CSI between the base station and the first terminal.

The receiver 1502 is further configured to receive an indication message sent by the first terminal.

The processor 1503 is configured to determine a size of a downlink transmission data block from the base station to the first terminal according to the first CSI and the indication message that are received by the receiver 1502.

The processor 1503 is further configured to notify the transmitter 1501 of the determined size of the downlink transmission data block from the base station to the first terminal.

The transmitter 1501 is configured to send, according to the size that is of the downlink transmission data block from the base station to the first terminal and that is determined by the processor 1503, downlink data stored in the memory 1504 to the first terminal, where a downlink transmission rate from the base station to the first terminal matches a downlink transmission rate from the first terminal to a second terminal, and the first terminal is configured to forward, to the second terminal, the downlink data sent by the base station.

Optionally, the indication message received by the receiver 1502 is second CSI, and the second CSI is CSI between the first terminal and the second terminal.

The processor 1503 is further configured to estimate a size of a second target data block according to the second CSI, where the second target data block is a downlink transmission data block transmitted on a resource allocated by the first terminal to the second terminal in a second subframe.

The processor 1503 is further configured to determine a size of a first target data block according to the first CSI and the size of the second target data block, where the first target data block is a downlink transmission data block transmitted on a resource allocated by the base station to the first terminal in a first subframe, a quantity of bits transmitted on the first target data block is less than or equal to a quantity of bits transmitted on the second target data block, and the second subframe is a subframe subsequent to the first subframe.

The transmitter 1501 is configured to send the first target data block to the first terminal in the first subframe.

Optionally, the receiver 1502 is further configured to receive a receive failure message sent by the first terminal, where the receive failure message is used to instruct the base station not to perform scheduling in a period of a third subframe, and the third subframe is a subframe subsequent to the second subframe.

The processor 1503 is further configured to determine, according to the receive failure message received by the receiver 1502, not to perform resource scheduling in the period of the third subframe.

Optionally, the receive failure message received by the receiver 1502 is used to indicate that the second terminal fails to receive the second target data block in the second subframe.

Optionally, the indication message received by the receiver 1502 is a rate change identifier, and the rate change identifier is used to indicate a rate change requirement on the downlink transmission rate from the base station to the first terminal.

The processor 1503 is further configured to determine the size of the downlink transmission data block from the base station to the first terminal according to the first CSI and the rate change identifier, where a change of the downlink transmission rate from the base station to the first terminal meets the rate change requirement indicated by the rate change identifier, so that a value of the downlink transmission rate from the base station to the first terminal is less than or equal to a value of the downlink transmission rate from the first terminal to the second terminal.

Optionally, the indication message received by the receiver 1502 is a second average rate, the second average rate is an average rate at which the first terminal sends the downlink data to the second terminal, and the processor 1503 is further configured to determine a first average rate according to the first CSI and the second average rate, where the first average rate is an average rate at which the base station sends the downlink data to the first terminal, and the first average rate is less than or equal to the second average rate.

The processor 1503 is further configured to determine the size of the downlink transmission data block from the base station to the first terminal according to the first average rate, where the average rate at which the base station sends the downlink data to the first terminal is the first average rate.

In the embodiments shown in FIG. 12 to FIG. 14, a specific structure of a first terminal is described from a perspective of a function module. The following describes the specific structure of the first terminal from a perspective of hardware with reference to an embodiment shown in FIG. 16.

Figure 16:
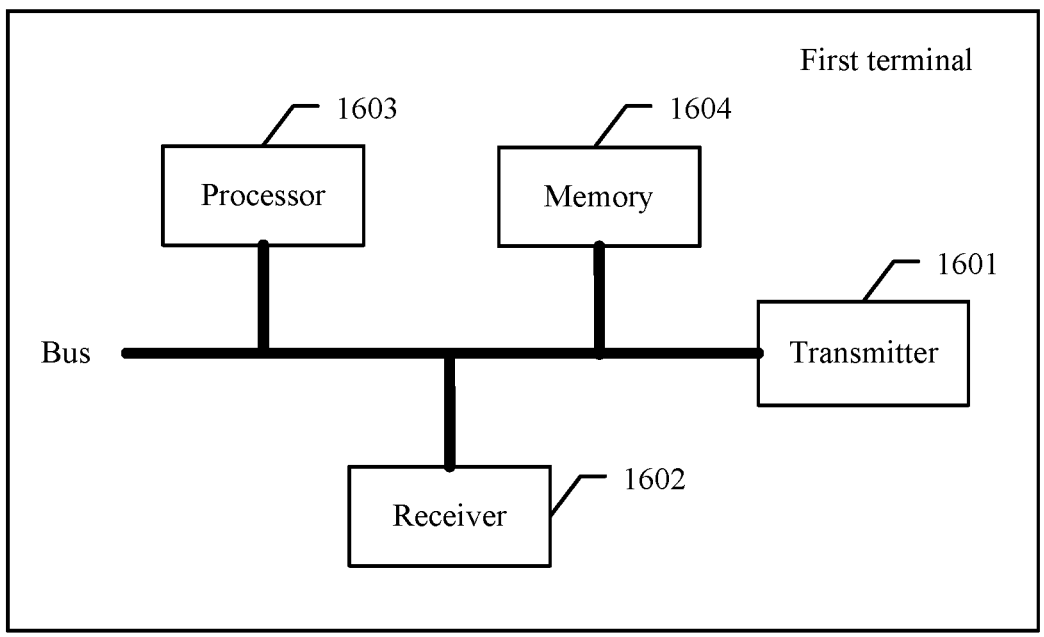
FIG. 16 is yet another schematic structural diagram of a first terminal according to an embodiment of the present invention.

As shown in FIG. 16, the first terminal includes a transmitter 1601.

The transmitter 1601 is configured to send first channel state information CSI and an indication message to a base station, where the first CSI is CSI between the base station and the first terminal, and the first CSI and the indication message are used to trigger the base station to determine a size of a downlink transmission data block from the base station to the first terminal according to the first CSI and the indication message, where a downlink transmission rate from the base station to the first terminal matches a downlink transmission rate from the first terminal to a second terminal, and the first terminal is configured to forward, to the second terminal, downlink data sent by the base station.

Still referring to FIG. 16, the first terminal further includes a processor 1603 and a receiver 1602, and the transmitter 1601 and the receiver 1602 are connected to the processor 1603.

In this embodiment, there may be one or more processors 1603, and one processor is used as an example for description in this embodiment.

In addition, in this embodiment, the transmitter 1601 and the receiver 1602 are connected to the processor 1603 by using a bus. Certainly, another connection manner may be used, and a specific connection manner is not limited in this embodiment.

The first terminal used in this embodiment of the present invention may have more or fewer components than those shown in FIG. 16, may combine two or more components, or may have different component configurations or settings. Various components may be implemented by hardware including one or more signal processing and/or application-specific integrated circuits, by software, or by a combination of hardware and software.

Optionally, the indication message sent by the transmitter 1601 is second CSI, the second CSI is CSI between the first terminal and the second terminal, and the processor is configured to determine a size of a second target data block according to the second CSI, where the second target data block is a downlink transmission data block transmitted on a resource allocated by the first terminal to the second terminal in a second subframe.

The receiver 1602 is configured to receive, in a first subframe, a first target data block sent by the base station, where the first target data block is a downlink transmission data block transmitted on a resource allocated by the base station to the first terminal in the first subframe, a quantity of bits transmitted on the first target data block is less than or equal to a quantity of bits transmitted on the second target data block, and the second subframe is a subframe subsequent to the first subframe.

The transmitter 1601 is further configured to send the second target data block to the second terminal in the second subframe.

Optionally, the transmitter 1601 is further configured to send, to the second terminal, a pilot signal that is used for channel estimation; and the receiver 1602 is further configured to receive the second CSI generated by the second terminal according to the pilot signal; or the receiver 1602 is further configured to receive a pilot signal that is used for channel estimation and sent by the second terminal; and the processor is further configured to perform channel estimation and generate the second CSI according to the pilot signal received by the receiver 1602.

Optionally, if the quantity of bits transmitted on the first target data block is less than the quantity of bits transmitted on the second target data block, the processor is further configured to perform null filling on the first target data block, to form the second target data block.

Optionally, the receiver 1602 is further configured to receive a receive failure message sent by the second terminal.

The transmitter 1601 is further configured to forward the receive failure message to the base station, where the receive failure message is used to instruct the base station not to perform scheduling in a period of a third subframe, and the third subframe is a subframe subsequent to the second subframe.

The transmitter 1601 is further configured to resend the second target data block to the second terminal in the third subframe.

Optionally, the receive failure message received by the receiver 1602 is used to indicate that the second terminal fails to receive the second target data block in the second subframe.

Optionally, the indication message sent by the transmitter 1601 is a rate change identifier, the rate change identifier is used to indicate a rate change requirement on the downlink transmission rate from the base station to the first terminal, and the rate change identifier is used to trigger the base station to determine the size of the downlink transmission data block from the base station to the first terminal according to the first CSI and the rate change identifier, so that a change of the downlink transmission rate from the base station to the first terminal meets the rate change requirement indicated by the rate change identifier, and a value of the downlink transmission rate from the base station to the first terminal is less than or equal to a value of the downlink transmission rate from the first terminal to the second terminal.

Optionally, further referring to FIG. 16, the first terminal further includes the processor 1603 and a memory 1604, and the processor 1603 is separately connected to the transmitter 1601 and the memory 1604.

In this embodiment, there may be one or more processors 1603, and one processor is used as an example for description in this embodiment.

In addition, in this embodiment, the transmitter 1601 and the memory 1604 are connected to the processor 1603 by using a bus. Certainly, another connection manner may be used, and a specific connection manner is not limited in this embodiment.

The first terminal used in this embodiment of the present invention may have more or fewer components than those shown in FIG. 16, may combine two or more components, or may have different component configurations or settings. Various components may be implemented by hardware including one or more signal processing and/or application-specific integrated circuits, by software, or by a combination of hardware and software.

The memory 1604 is configured to cache transmitted data.

The processor is configured to determine the rate change identifier according to a length of the transmitted data cached in the memory 1604.

Optionally, the indication message sent by the transmitter 1601 is a second average rate, the second average rate is an average rate at which the first terminal sends the downlink data to the second terminal, and the second average rate is used to trigger the base station to determine a first average rate according to the first CSI and the second average rate, where the first average rate is an average rate at which the base station sends the downlink data to the first terminal, the first average rate is less than or equal to the second average rate, and the first average rate is used to trigger the base station to determine the size of the downlink transmission data block from the base station to the first terminal according to the first average rate.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
receiving, by a base station, first channel state information (CSI) sent by a first terminal, wherein the first CSI is CSI between the base station and the first terminal;
receiving, by the base station, an indication message sent by the first terminal; and
determining, by the base station, a size of a downlink transmission data block from the base station to the first terminal according to the first CSI and the indication message, wherein a downlink transmission rate from the base station to the first terminal matches a downlink transmission rate from the first terminal to a second terminal, wherein the first terminal is configured to forward, to the second terminal, downlink data sent by the base station, and wherein the first terminal has a longer battery life than the second terminal.

2. The method according to claim 1, wherein the indication message comprises second CSI, wherein the second CSI is CSI between the first terminal and the second terminal, and wherein the determining, by the base station, a size of a downlink transmission data block from the base station to the first terminal according to the first CSI and the indication message comprises:
estimating, by the base station, a size of a second target data block according to the second CSI, wherein the second target data block is a downlink transmission data block transmitted on a resource allocated by the first terminal to the second terminal in a second subframe; and
determining, by the base station, a size of a first target data block according to the first CSI and the size of the second target data block, wherein the first target data block is a downlink transmission data block transmitted on a resource allocated by the base station to the first terminal in a first subframe, wherein a quantity of bits transmitted on the first target data block is less than or equal to a quantity of bits transmitted on the second target data block, and wherein the second subframe is a subframe subsequent to the first subframe; and
the method further comprises, after the determining, by the base station, a size of a downlink transmission data block from the base station to the first terminal according to the first CSI and the indication message:
sending, by the base station, the first target data block to the first terminal in the first subframe.

3. The method according to claim 2, wherein the method further comprises, after the sending, by the base station, the first target data block to the first terminal in the first subframe:
receiving, by the base station, a receive failure message sent by the first terminal, wherein the receive failure message is used to instruct the base station not to perform scheduling in a period of a third subframe, and wherein the third subframe is a subframe subsequent to the second subframe; and
determining, by the base station according to the receive failure message, not to perform resource scheduling in the period of the third subframe.

4. The method according to claim 3, wherein the receive failure message is used to indicate that the second terminal fails to receive the second target data block in the second subframe.

5. The method according to claim 1, wherein the indication message is a rate change identifier, wherein the rate change identifier is used to indicate a rate change requirement on the downlink transmission rate from the base station to the first terminal, and wherein the determining, by the base station, a size of a downlink transmission data block from the base station to the first terminal according to the first CSI and the indication message comprises:
determining, by the base station, the size of the downlink transmission data block from the base station to the first terminal according to the first CSI and the rate change identifier, wherein a change of the downlink transmission rate from the base station to the first terminal meets the rate change requirement indicated by the rate change identifier, wherein a value of the downlink transmission rate from the base station to the first terminal is less than or equal to a value of the downlink transmission rate from the first terminal to the second terminal.

6. A data transmission method, comprising:
sending, by a first terminal, first channel state information (CSI) and an indication message to a base station, wherein the first CSI is CSI between the base station and the first terminal, and wherein the first CSI and the indication message are used to trigger the base station to determine a size of a downlink transmission data block from the base station to the first terminal according to the first CSI and the indication message, wherein a downlink transmission rate from the base station to the first terminal matches a downlink transmission rate from the first terminal to a second terminal; and
forwarding, by the first terminal to the second terminal, downlink data sent by the base station, wherein the first terminal has more antennas than the second terminal.

7. The method according to claim 6, wherein the indication message comprises second CSI, wherein the second CSI is CSI between the first terminal and the second terminal; and wherein the method further comprises:
determining, by the first terminal, a size of a second target data block according to the second CSI, wherein the second target data block is a downlink transmission data block transmitted on a resource allocated by the first terminal to the second terminal in a second subframe;
receiving, by the first terminal in a first subframe, a first target data block sent by the base station, wherein the first target data block is a downlink transmission data block transmitted on a resource allocated by the base station to the first terminal in the first subframe, wherein a quantity of bits transmitted on the first target data block is less than or equal to a quantity of bits transmitted on the second target data block, and wherein the second subframe is a subframe subsequent to the first subframe; and
sending, by the first terminal, the second target data block to the second terminal in the second subframe.

8. The method according to claim 7, wherein the method further comprises, before the sending, by a first terminal, first CSI and an indication message to a base station:
sending, by the first terminal to the second terminal, a pilot signal that is used for channel estimation, and receiving, by the first terminal, the second CSI generated by the second terminal according to the pilot signal; or
receiving, by the first terminal, a pilot signal that is used for channel estimation and sent by the second terminal, and performing, by the first terminal, channel estimation and generating the second CSI according to the pilot signal.

9. The method according to claim 7, wherein if the quantity of bits transmitted on the first target data block is less than the quantity of bits transmitted on the second target data block, the method further comprises, before the sending, by the first terminal, the second target data block to the second terminal in the second subframe:
performing, by the first terminal, null filling on the first target data block to form the second target data block.

10. The method according to claim 7, wherein the method further comprises, after the sending, by the first terminal, the second target data block to the second terminal in the second subframe:
receiving, by the first terminal, a receive failure message sent by the second terminal;
forwarding, by the first terminal, the receive failure message to the base station, wherein the receive failure message is used to instruct the base station not to perform scheduling in a period of a third subframe, and wherein the third subframe is a subframe subsequent to the second subframe; and
resending, by the first terminal, the second target data block to the second terminal in the third subframe.

11. The method according to claim 10, wherein the receive failure message is used to indicate that the second terminal fails to receive the second target data block in the second subframe.

12. The method according to claim 6, wherein the indication message is a rate change identifier, wherein the rate change identifier is used to indicate a rate change requirement on the downlink transmission rate from the base station to the first terminal, and wherein the rate change identifier is used to trigger the base station to determine the size of the downlink transmission data block from the base station to the first terminal according to the first CSI and the rate change identifier, wherein a change of the downlink transmission rate from the base station to the first terminal meets the rate change requirement indicated by the rate change identifier, and wherein a value of the downlink transmission rate from the base station to the first terminal is less than or equal to a value of the downlink transmission rate from the first terminal to the second terminal.

13. The method according to claim 12, wherein the method further comprises, before the sending, by a first terminal, first CSI and an indication message to a base station:
determining, by the first terminal, the rate change identifier according to a length of to-be-transmitted data cached in the first terminal.

14. A first terminal comprising:
a transmitter, wherein the transmitter is configured to:
send first channel state information (CSI) and an indication message to a base station, wherein the first CSI is CSI between the base station and the first terminal, and wherein the first CSI and the indication message are used to trigger the base station to determine a size of a downlink transmission data block from the base station to the first terminal according to the first CSI and the indication message, and wherein a downlink transmission rate from the base station to the first terminal matches a downlink transmission rate from the first terminal to a second terminal; and
forward, to the second terminal, downlink data sent by the base station, wherein the first terminal includes a smartphone or a tablet computer, and wherein the second terminal includes a wearable device.

15. The first terminal according to claim 14, wherein the indication message sent by the transmitter comprises second CSI, wherein the second CSI is CSI between the first terminal and the second terminal, and wherein the first terminal further comprises at least one processor and a receiver, wherein the transmitter and the receiver are connected to the at least one processor, and wherein:
the at least one processor is configured to determine a size of a second target data block according to the second CSI, wherein the second target data block is a downlink transmission data block transmitted on a resource allocated by the first terminal to the second terminal in a second subframe;
the receiver is configured to receive, in a first subframe, a first target data block sent by the base station, wherein the first target data block is a downlink transmission data block transmitted on a resource allocated by the base station to the first terminal in the first subframe, wherein a quantity of bits transmitted on the first target data block is less than or equal to a quantity of bits transmitted on the second target data block, and wherein the second subframe is a subframe subsequent to the first subframe; and
the transmitter is further configured to send the second target data block to the second terminal in the second subframe.

16. The first terminal according to claim 15, wherein:
the transmitter is further configured to send, to the second terminal, a pilot signal that is used for channel estimation, and the receiver is further configured to receive the second CSI generated by the second terminal according to the pilot signal; or
the receiver is further configured to receive a pilot signal that is used for channel estimation and sent by the second terminal, and the at least one processor is further configured to perform channel estimation and generate the second CSI according to the pilot signal received by the receiver.

17. The first terminal according to claim 15, wherein if the quantity of bits transmitted on the first target data block is less than the quantity of bits transmitted on the second target data block, the at least one processor is further configured to perform null filling on the first target data block to form the second target data block.

18. The first terminal according to claim 15, wherein:
the receiver is further configured to receive a receive failure message sent by the second terminal;
the transmitter is further configured to forward the receive failure message to the base station, wherein the receive failure message is used to instruct the base station not to perform scheduling in a period of a third subframe, and wherein the third subframe is a subframe subsequent to the second subframe; and the transmitter is further configured to resend the second target data block to the second terminal in the third subframe.

19. The first terminal according to claim 14, wherein the indication message sent by the transmitter is a rate change identifier, wherein the rate change identifier is used to indicate a rate change requirement on the downlink transmission rate from the base station to the first terminal, wherein the rate change identifier is used to trigger the base station to determine the size of the downlink transmission data block from the base station to the first terminal according to the first CSI and the rate change identifier, wherein a change of the downlink transmission rate from the base station to the first terminal meets the rate change requirement indicated by the rate change identifier, and wherein a value of the downlink transmission rate from the base station to the first terminal is less than or equal to a value of the downlink transmission rate from the first terminal to the second terminal.

20. The first terminal according to claim 19, wherein the first terminal further comprises at least one processor and a memory, wherein the at least one processor is separately connected to the transmitter and the memory;

the memory is configured to cache transmitted data; and the at least one processor is configured to determine the rate change identifier according to a length of the transmitted data cached in the memory.

* * * * *